United States Patent
Kang et al.

(10) Patent No.: US 9,590,266 B2
(45) Date of Patent: Mar. 7, 2017

(54) ELECTROLYTE FOR LITHIUM SECONDARY BATTERY AND LITHIUM SECONDARY BATTERY INCLUDING THE SAME

(75) Inventors: Yoon-sok Kang, Seongnam-si (KR);
Min-sik Park, Hwaseong-si (KR);
Jun-young Mun, Seoul (KR);
Jin-hwan Park, Seoul (KR);
Dong-joon Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 924 days.

(21) Appl. No.: 13/546,697

(22) Filed: Jul. 11, 2012

(65) Prior Publication Data
US 2013/0078533 A1    Mar. 28, 2013

(30) Foreign Application Priority Data
Sep. 22, 2011  (KR) .................. 10-2011-0095812

(51) Int. Cl.
  *H01M 10/0525* (2010.01)
  *H01M 10/0567* (2010.01)
  *H01M 10/0569* (2010.01)

(52) U.S. Cl.
  CPC ... *H01M 10/0525* (2013.01); *H01M 10/0567* (2013.01); *H01M 10/0569* (2013.01); *Y02E 60/122* (2013.01); *Y02T 10/7011* (2013.01)

(58) Field of Classification Search
  None
  See application file for complete search history.

(56) References Cited

U.S. PATENT DOCUMENTS

| | | | |
|---|---|---|---|
| 3,939,084 A * | 2/1976 | Sullivan | 508/256 |
| 5,731,106 A | 3/1998 | Tsutsumi et al. | |
| 5,776,627 A | 7/1998 | Mao et al. | |
| 2001/0004507 A1 | 6/2001 | Gan et al. | |
| 2003/0116445 A1 | 6/2003 | Sun et al. | |
| 2003/0190530 A1 | 10/2003 | Yang et al. | |
| 2006/0105239 A1 * | 5/2006 | Paulsen et al. | 429/231.3 |

FOREIGN PATENT DOCUMENTS

| | | |
|---|---|---|
| CN | 1819324 A | 8/2006 |
| CN | WO 2010/123046 A1 | 10/2010 |
| JP | 06349523 A | 12/1994 |
| JP | H1074537 A | 3/1998 |

(Continued)

OTHER PUBLICATIONS

STIC search Obtained Jun. 18, 2015.*

(Continued)

*Primary Examiner* — Sarah A Slifka
(74) *Attorney, Agent, or Firm* — Cantor Colburn LLP

(57) ABSTRACT

An electrolyte for a lithium secondary battery, the electrolyte including a lithium salt, a non-aqueous organic solvent, and a polar additive based on a substituted hetero-bicyclic compound. Oxidation of the electrolyte is prevented by formation of a polar thin film on a surface portion of the positive electrode, which facilitates transfer of lithium ions. The lithium secondary batteries using the electrolyte have excellent high temperature life characteristics and high temperature conservation characteristics.

23 Claims, 8 Drawing Sheets

(56) References Cited

FOREIGN PATENT DOCUMENTS

| | | |
|---|---|---|
| JP | H1167272 A | 3/1999 |
| JP | 2000294273 A | 10/2000 |
| JP | 2001143748 A | 5/2001 |
| JP | 2002141067 A | 5/2002 |
| JP | 2003-123837 | 4/2003 |
| JP | 2007087737 A | 4/2007 |
| JP | 2007201082 A | 8/2007 |
| JP | 2007250380 A | 9/2007 |
| JP | 2008052988 A | 3/2008 |
| JP | 2009238587 A | 10/2009 |
| JP | 2009272243 A | 11/2009 |
| JP | 2010084094 A | 4/2010 |
| JP | 2011134459 A | 7/2011 |
| KR | 1020040080775 A | 9/2004 |
| KR | 20120110874 A | 10/2012 |
| KR | 20120111786 A | 10/2012 |
| WO | 8400853 A1 | 3/1984 |

OTHER PUBLICATIONS

Extended European Search Report for Application No. 12177702.3-1227 dated Jan. 16, 2013.

Cigdem Sahin, et al.; The Synthesis and Characterization of 2-(2'-Pyridyl)Benzimidazole Heteroleptic Ruthenium Complex: Efficient Sensitizer for Molecular Photovoltaics; Elsevier, Science Direct, Dyes and Pigments 84; 2010; pp. 88-94.

Hitoshi Kusama, et al.; Influence of Benzimidazole Additives in Electrolytic Solution on Dye-Sensitized Solar Cell Performance; Elsevier, Science Direct, Journal of Photochemistry and Photobiology A: Chemistry 162; 2004; pp. 441-448.

European Examination Report for Application No. 12 177 702.3-1359 dated May 22, 2015.

Office Action issued for JP Application No. 2012-205466; Filing Date Sep. 19, 2012; Office Action Mail Date Apr. 5, 2016; 6 pages (English Translation Provided, 13 pages).

* cited by examiner

ELECTROLYTE FOR LITHIUM SECONDARY BATTERY AND LITHIUM SECONDARY BATTERY INCLUDING THE SAME

CROSS-REFERENCE TO RELATED APPLICATIONS

This application claims the benefit of Korean Application No. 10-2011-0095812, filed on Sep. 22, 2011 in the Korean Intellectual Property Office, the disclosure of which is incorporated herein by reference.

BACKGROUND OF THE INVENTION

1. Field of the Invention

Aspects of the present disclosure relate to electrolytes for lithium secondary batteries and lithium secondary batteries including the electrolytes, and more particularly, to electrolytes for lithium secondary batteries that improve high temperature lifetime characteristics and high temperature conservation characteristics of the battery as well as lithium secondary batteries including the electrolytes.

2. Description of the Related Art

Lithium secondary batteries are rechargeable at a high speed, and have an energy density per unit weight that is at least three times greater than that of existing lead storage batteries, nickel-cadmium batteries, nickel-hydrogen batteries, or nickel-zinc batteries. In addition, the charging rates of lithium secondary batteries are high. Due to such features, research and development of lithium secondary batteries are actively being performed.

In general, a lithium secondary battery includes a positive electrode, a negative electrode, a separator and an electrolyte disposed between the positive electrode and the negative electrode. In particular, a method of improving performance of a lithium secondary battery by adding a small amount of additives to an electrolyte without largely affecting physical properties of the electrolyte draws much attention.

Electrolyte additives have various functions. For example, the additive may form a solid electrolyte interface (SEI) for preventing direct contact between an electrode active material and the electrolyte. Additives for forming an SEI on the surface of an electrode can be classified as an anode additive for helping to form an SEI on the surface of graphite and an overcharge protection (OCP) additive for forming a thick film on the surface of a positive electrode.

As recent demand for lithium secondary batteries having high energy density, for example, batteries for electric vehicles, increases, research into high voltage positive active materials has been conducted. However, research into an electrolyte additive for preventing oxidation of an electrolyte occurring at the surface of a cathode active material has not yet been implemented.

In general, the potential window of an electrolyte needs to be wider than the potential difference between the positive active material and the negative active material. However, as an active material for high voltage is used to increase the energy density of a battery, the potential window of the electrolyte becomes narrower than that between the positive active material and the negative active material. Accordingly, decomposition of the electrolyte may be prevented by forming a film for preventing direct contact between the electrolyte and the electrode active material.

If aromatic compounds such as biphenyl and terphenyl are used as electrolyte additives, the electrolyte additive functions as an OCP by forming a thick film at the surface of the cathode when the voltage of the battery is equal to or higher than a reference voltage value so as to block passage of lithium ions and current flow. Recently, a method of forming a thin film at the surface of a cathode by using a low concentration of an additive has been introduced. However, the battery characteristics obtained are not satisfactory and thus there is still plenty of room for improvement.

SUMMARY OF THE INVENTION

Aspects of the present invention provide electrolytes for lithium secondary batteries in which oxidation thereof at a surface of a positive electrode is prevented and which form a polar thin film on a surface portion of the positive electrode, thereby facilitating transfer of lithium ions.

Aspects of the present invention provide lithium secondary batteries having excellent high temperature life characteristics and high temperature conservation characteristics.

According to an aspect of the present invention, an electrolyte for a lithium secondary battery includes a lithium salt, a non-aqueous organic solvent, and an additive represented by Formula 1 below:

<Formula 1>

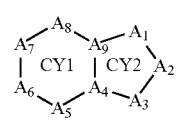

wherein $A_1$ to $A_9$ are each, independently,

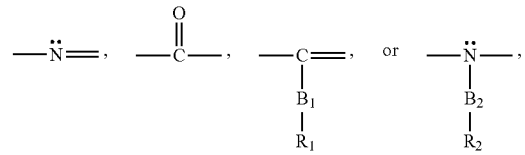

with the proviso that $A_1$ to $A_9$ include at least one of

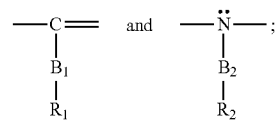

CY1 is a C3-C6 aromatic ring, and CY2 is a C3-C5 aromatic or non-aromatic ring;

$B_1$ and $B_2$ are each independently a single bond,

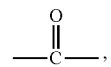

or a C1-C5 alkylene group; and $R_1$ and $R_2$ are each independently hydrogen, a halogen group, a cyano group, a hydroxyl group, —C(=O)$R_a$, —C(=O)O$R_a$, —OCO(O$R_a$), —C=N($R_a$), —S$R_a$, —S(=O)$R_a$, —S(=O)$_2R_a$, —P$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or combinations thereof, wherein $R_a$ is hydrogen, a C1-C10 alkyl group, or a C6-C20 aryl group, with the proviso that at least one of $R_1$ and $R_2$ includes a polar functional group selected from the group consisting of a halogen group, a hydroxyl group, —C(=O)$R_a$, —C(=O)O$R_a$, —OCO(O$R_a$), C=N($R_a$), —S$R_a$, —P$R_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group.

The additive may be represented by Formula 2 below:

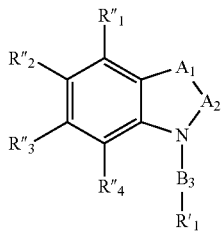

<Formula 2> wherein $A_1$ and $A_2$ are each, independently,

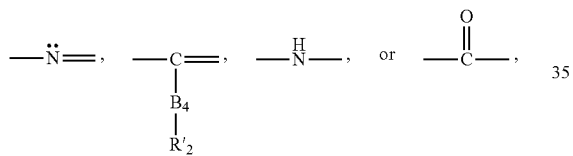

with the proviso that $A_1$ and $A_2$ include at least one of

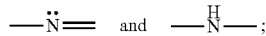

$B_3$ and $B_4$ are each independently a single bond,

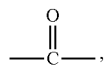

or a C1-C5 alkylene group; and $R'_1$, $R''_1$, $R''_2$, $R''_3$, and $R''_4$ are each independently hydrogen, a halogen group, a hydroxyl group, a cyano group, —C(=O)$R_a$, —C(=O)O$R_a$, —OCO(O$R_a$), —C=N($R_a$), —S$R_a$, —S(=O)$R_a$, —S(=O)$_2 R_a$, —P$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or a combination thereof, wherein $R_a$ is hydrogen, a C1-C10 alkyl group, or a C6-C20 aryl group, with the proviso that at least one of $R'_1$, $R''_1$, $R''_2$, $R''_3$, and $R''_4$ includes a polar functional group selected from the group consisting of a halogen group, a hydroxyl group, —C(=O)$R_a$, —C(=O)O$R_a$, —OCO(O$R_a$), C=N($R_a$), —S$R_a$, —P$R_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group.

The additive may be at least one selected from the group consisting of

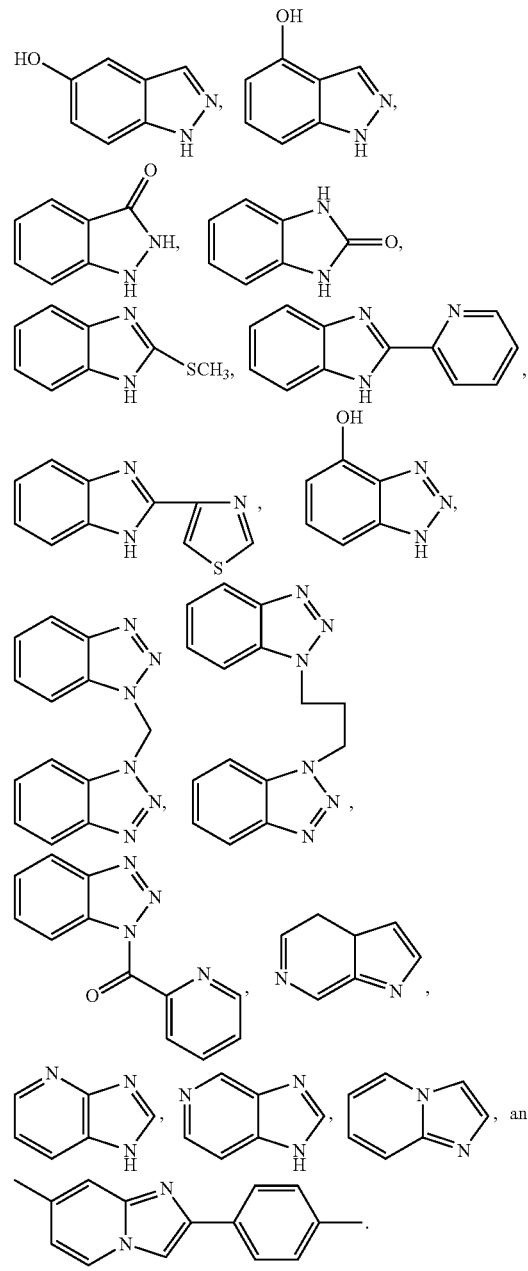

The amount of the additive may be in a range of about 0.005 to about 10 wt % based on the total weight of the electrolyte.

The lithium salt may be one selected from LiPF$_6$, LiBF$_4$, LiSbF$_6$, LiAsF$_6$, LiCF$_3$SO$_3$, Li(CF$_3$SO$_2$)$_3$C, Li(CF$_3$SO$_2$)$_2$N, LiC$_4$F$_9$SO$_3$, LiClO$_4$, LiAlO$_2$, LiAlCl$_4$, LiBPh$_4$, LiN($C_xF_{2x+1}SO_2$)($C_xF_{2y+1}SO_2$) where x and y are natural numbers, LiCl, LiI, lithium bisoxalate borate (LIBOB), and combinations thereof.

The non-aqueous organic solvent may be a carbonate-based solvent, an ester-based solvent, an ether-based solvent, a ketone-based solvent, an alcohol-based solvent, a non-protonic solvent, or combinations thereof.

According to another aspect of the present invention, a lithium secondary battery includes a positive electrode including a positive active material into or from which lithium ions are intercalated or deintercalated; a negative electrode including a negative active material into or from which lithium ions are intercalated or deintercalated; and an electrolyte interposed between the positive electrode and the negative electrode, wherein the electrolyte includes a lithium salt, a non-aqueous organic solvent, and an additive represented by Formula 1 below:

<Formula 1>

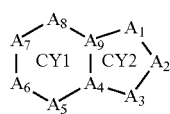

wherein $A_1$ to $A_9$ are each, independently,

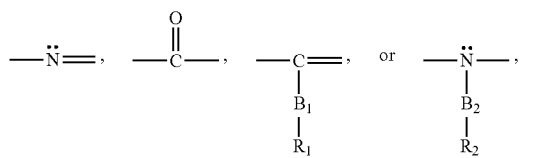

with the proviso that $A_1$ to $A_9$ include at least one of

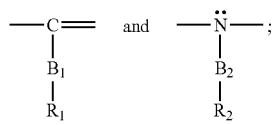

CY1 is a C3-C6 aromatic ring, and CY2 is a C3-C5 aromatic or non-aromatic ring;

$B_1$ and $B_2$ are each independently a single bond,

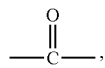

or a C1-C5 alkylene group; and $R_1$ and $R_2$ are each independently hydrogen, a halogen group, a cyano group, a hydroxyl group, —C(=O)$R_a$, —C(=O)O$R_a$, —OCO(O$R_a$), —C=N($R_a$), —S$R_a$, —S(=O)$R_a$, —S(=O)$_2R_a$, —P$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or combinations thereof, wherein $R_a$ is hydrogen, a C1-C10 alkyl group, or a C6-C20 aryl group, with the proviso that at least one of $R_1$ and $R_2$ includes a polar functional group selected from the group consisting of a halogen group, a hydroxyl group, —C(=O)$R_a$, —C(=O)O$R_a$, —OCO(O$R_a$), C=N($R_a$), —S$R_a$, —P$R_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group.

The positive electrode includes a film formed on its surface, wherein the film is partially or fully derived from the additive in the electrolyte.

The thickness of the film may be in a range of about 0.5 nm to about 100 nm.

The amount of the additive may be in a range of about 0.005 to about 10 wt % based on the total weight of the electrolyte.

The positive active material may be at least one selected from the group consisting of $LiCoO_2$, $LiNi_{1-x}Co_xO_2$ where $0 \leq x < 1$, $Li_{1-x}M_xO_2$ where M is Mn or Fe and $0.03 \leq x < 0.1$, $Li[Ni_xCo_{1-2x}Mnx]O_2$ where $0 < x < 0.5$, $Li[Ni_xMn_x]O_2$ where $0 < x \leq 0.5$, $Li_{1+x}(M)_{1-y}O_z$ where $0 < x \leq 1$, $0 \leq y < 1$, $2 \leq z \leq 4$, and M is a transition metal, $LiM_2O_4$ where M is Ti, V, or Mn, $LiM_xMn_{2-x}O_4$ where M is a transition metal, $LiFePO_4$, $LiMPO_4$ where M is Mn, Co, or Ni, $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$-$Mn_yV_2O_5$, $\delta$-$NH_4V_4O_{10}$, $Mn_{0.8}V_7O_{16}$, $LiV_3O_5$, $Cu_xV_2O_5$, $Cr_xV_6O_{13}$, $M_2(XO_4)_3$ where M is a transition metal and X is S, P, As, Mo, or W, and $Li_3M_2(PO_4)_3$ where M is Fe, V, or Ti.

The positive active material may have an operating potential of 4.5V±0.5V.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, in which.

DETAILED DESCRIPTION

Figure 1:
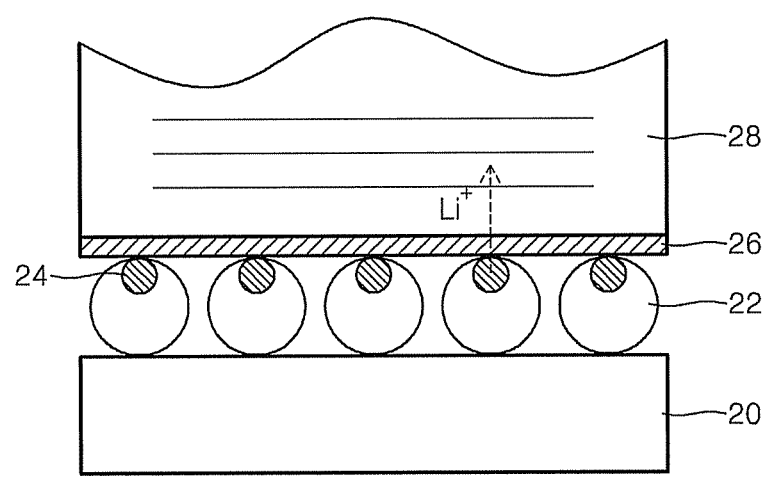
FIG. 1 is a schematic diagram illustrating a solid electrolyte interface (SEI) film formed at the surface of the positive electrode, when an additive for a lithium secondary battery according to an embodiment of the present invention is added to the electrolyte.

Reference will now be made in detail to the present embodiments of the present invention, examples of which are illustrated in the accompanying drawings, wherein like reference numerals refer to the like elements throughout. The embodiments are described below in order to explain the present invention. As used herein, the term "and/or" includes any and all combinations of one or more of the associated listed items. Expressions such as "at least one of," when preceding a list of elements, modify the entire list of elements and do not modify the individual elements of the list.

Hereinafter, one or more embodiments of an electrolyte for a lithium secondary battery and a lithium secondary battery including the electrolyte will be described in detail. However, these embodiments are provided only for illustrative purposes and are not intended to limit the scope of the present invention.

According to an embodiment of the present invention, an electrolyte for a lithium secondary battery includes a lithium salt, a non-aqueous organic solvent, and an additive represented by Formula 1 below:

<Formula 1>

wherein $A_1$ to $A_9$ are each, independently,

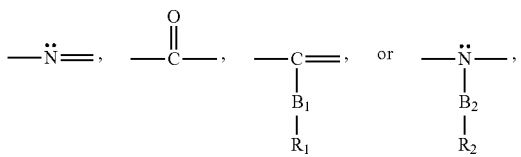

with the proviso that $A_1$ to $A_9$ include at least one of

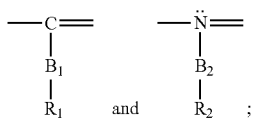

CY1 is a C3-C6 aromatic ring, and CY2 is a C3-C5 aromatic or non-aromatic ring;

$B_1$ and $B_2$ are each independently a single bond,

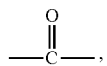

or a C1-C5 alkylene group; and $R_1$ and $R_2$ are each independently hydrogen, a halogen group, a cyano group, a hydroxyl group, —C(=O)$R_a$, —C(=O)O$R_a$, —OCO(O$R_a$), —C=N($R_a$), —S$R_a$, —S(=O)$R_a$, —S(=O)$_2R_a$, —P$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or combinations thereof, wherein $R_a$ is hydrogen, a C1-C10 alkyl group, or a C6-C20 aryl group, with the proviso that at least one of $R_1$ and $R_2$ includes a polar functional group selected from the group consisting of a halogen group, a hydroxyl group, —C(=O)$R_a$, —C(=O)O$R_a$, —OCO(O$R_a$), C=N($R_a$), —S$R_a$, —P$R_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group.

The additive of Formula 1 may be a benzazole-based compound having a polar functional group or derivatives thereof. Examples of the benzazole-based compound include an indazole-based compound, a benzimidazole-based compound, and a benzotriazole-based compound.

The additive of Formula 1 is oxidized before the non-aqueous organic solvent is oxidized because the additive has a lower oxidation potential than that of the non-aqueous organic solvent, thereby when oxidized forming a film on a surface of a positive electrode. Thus, oxidation of the electrolyte on the surface of the positive electrode may be prevented.

When an oxidation potential of the additive of Formula 1 is calculated using a polarizable continuum model (PCM) and density functional theory, B3LY, for example, by Gaussian O3 code and a 6-311+G(d, p) basis for calculation, it can be confirmed that the additive of Formula 1 is oxidized before the non-aqueous organic solvent is oxidized because of the lower oxidation potential of the additive of Formula 1 than that of the non-aqueous organic solvent by about 2V.

In addition, the additive of Formula 1 includes a nitrogen atom having non-covalent electron pairs in a heterocyclic ring and a polar functional group having non-covalent electron pairs with an electron donating ability, and thus has a core part with a reduced oxidation potential, thereby forming a thin film. Also, the additive of Formula 1 can provide a path for smoothly transferring lithium ions of the electrolyte, whereby a lithium secondary battery with improved lifetime characteristics may be obtained.

FIG. 1 is a schematic diagram illustrating that an SEI film 26 is formed on a surface portion of a positive electrode including a current collector 20 when an additive for a lithium secondary battery according to an embodiment is added to an electrolyte 28.

Referring to FIG. 1, when an additive of the electrolyte for a lithium secondary battery is used, the SEI film 26, which is thin and solid, is formed on a surface of a positive active material 22 as a surface portion of the positive electrode including a current collector 20, and thus lithium ions 24 are effectively transferred from the positive electrode including a current collector 20 to an electrolyte 28.

In particular, the additive of Formula 1 includes a nitrogen atom having non-covalent electron pairs in a heterocyclic ring and a polar functional group having non-covalent electron pairs with an electron donating ability, and thus forms a polymer with a non-aqueous organic solvent. Accordingly, the SEI film 26, which is lithium-ion conductive, is formed on the positive active material 22, and a path for more smoothly transferring lithium ions of the electrolyte 28 is provided, which can be confirmed with reference to FIG. 2.

The film formed on the surface of the positive electrode 20 suppresses additional electrolyte side reactions and elution of metal ions even when a battery is exposed to a high temperature, thereby contributing to improved high temperature conservation characteristics and lifetime characteristics.

The definition of the term "the substituent (or substituted group)" in Formula 1 will be described below.

The term "substituted" used herein with respect to the above groups alkyl, alkoxy, alkenyl, alkynyl, alkylene oxide, cycloalkyl, aryl, aryloxy, and heteroaryl in Formula 1 refers to substitution with a halogen atom, a C1-C20 alkyl group substituted with a halogen atom (e.g., $CCF_3$, $CHCF_2$, $CH_2F$, $CCl_3$, etc.), a hydroxyl group, a nitro group, a cyano group, an amino group, an amidino group, hydrazine, hydrazone, a carboxyl group or a salt thereof, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

Examples of the C1-C20 alkyl group used herein include methyl; ethyl, propyl, isobutyl, sec-butyl, tert-butyl, normal-butyl, iso-pentyl, and hexyl. In this regard, at least one hydrogen atom of the alkyl group may be substituted with the same substituent as that defined with respect to the term "substituted" above.

Examples of the C1-C20 alkoxy group used herein include methoxy, ethoxy, and propoxy. In this regard, at least one hydrogen atom of the alkoxy group may be substituted with the same substituent as that defined with respect to the term "substituted" above.

Examples of the C2-C20 alkenyl group used herein include vinylene and allylene. In this regard, at least one hydrogen atom of the alkenyl group may be substituted with the same substituent as that defined with respect to the term "substituted" above.

The C2-C20 alkynyl group used herein may be, for example, acetylene. In this regard, at least one hydrogen atom of the alkynyl group may be substituted with the same substituent as that defined with respect to the term "substituted" above.

Examples of the C2-C20 alkylene oxide group used herein include ethylene oxide, propylene oxide, and butylene oxide.

Examples of the C3-C30 cycloalkyl group used herein include cyclopropyl, cyclobutyl, cyclopentyl, and cyclohexyl. In this regard, at least one hydrogen atom of the cycloalkyl group may be substituted with the same substituent as that defined with respect to the term "substituted" above.

The C6-C30 aryl group used herein may be used alone or in combination, and refers to an aromatic system including at least one ring. For example, the C6-C30 aryl group may be phenyl, naphthyl, or tetrahydronaphthyl. In this regard, at least one hydrogen atom of the aryl group may be substituted with the same substituent as that defined with respect to the term "substituted" above.

The C6-C30 aryloxy group used herein may be phenoxy. In this regard, at least one hydrogen atom of the aryloxy group may be substituted with the same substituent as that defined with respect to the term "substituted" above.

The C6-C30 heteroaryl group used herein refers to an organic compound including at least one hetero atom selected from the group consisting of N, O, P, and S, and the remaining atoms of carbon. For example, the C6-C30 heteroaryl group may be pyridyl. In this regard, at least one hydrogen atom of the heteroaryl group may be substituted with the same substituent as that defined with respect to the term "substituted" above.

The additive may be represented by Formula 2 below:

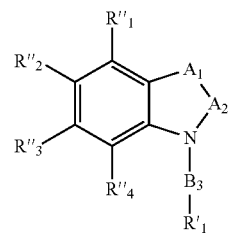

<Formula 2> wherein $A_1$ and $A_2$ are each, independently,

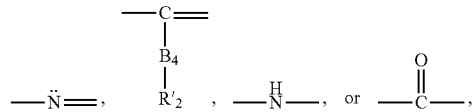

with the proviso that $A_1$ and $A_2$ include at least one of

$B_3$ and $B_4$ are each independently a single bond,

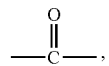

or a C1-C5 alkylene group; and $R'_1$, $R''_1$, $R''_2$, $R''_3$, and $R''_4$ are each independently hydrogen, a halogen group, a hydroxyl group, a cyano group, $—C(=O)R_a$, $—C(=O)OR_a$, $—OCO(OR_a)$, $—C=N(R_a)$, $—SR_a$, $—S(=O)R_a$, $—S(=O)_2R_a$, $—PR_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or a combination thereof, wherein $R_a$ is hydrogen, a C1-C10 alkyl group, or a C6-C20 aryl group, and wherein at least one of $R'_1$, $R''_1$, $R''_2$, $R''_3$, and $R''_4$ includes a polar functional group selected from the group consisting of a halogen group, a hydroxyl group, —C(=O)R$_a$, —C(=O)OR$_a$, —OCO(OR$_a$), C=N(R$_a$), —SR$_a$, —PR$_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group.

The substituents used in Formula 2 are the same as defined in Formula 1.

The additive of Formula 2 may be a benzazole-based compound. Examples of the benzazole-based compound include an indazole-based compound, a benzimidazole-based compound, and a benzotriazole-based compound.

The additive of Formula 2 includes a nitrogen atom having non-covalent electron pairs in a heterocyclic ring and a polar functional group having non-covalent electron pairs with an electron-donating ability, and thus has a core part with a reduced oxidation potential. Therefore, the additive is oxidized before an electrolyte is oxidized on a surface of a positive electrode, and thus a film may be formed within a short time.

For example, the additive may be at least one selected from the group consisting of

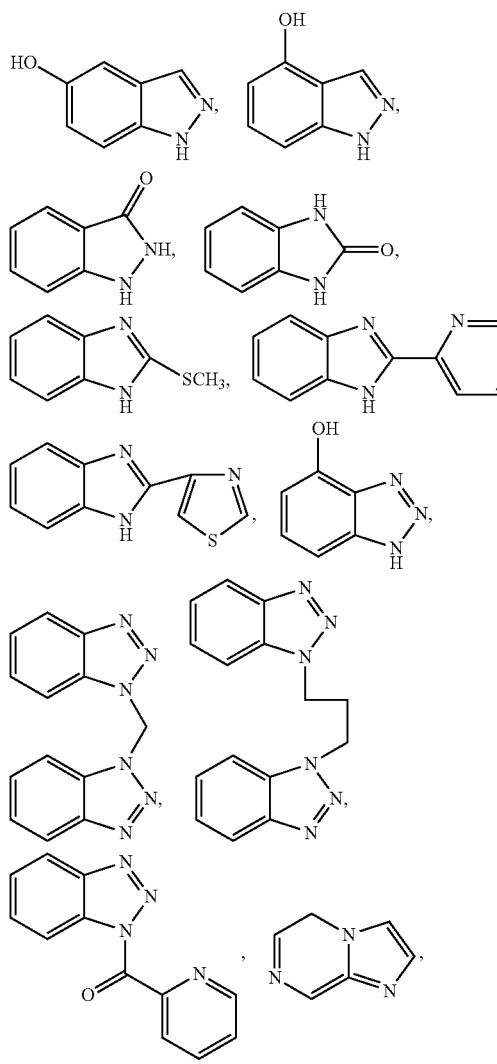

-continued

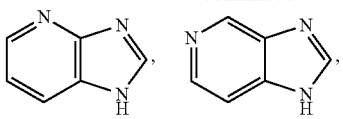

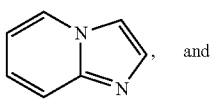

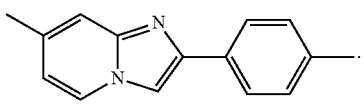

For example, the additive may be at least one selected from the group consisting of

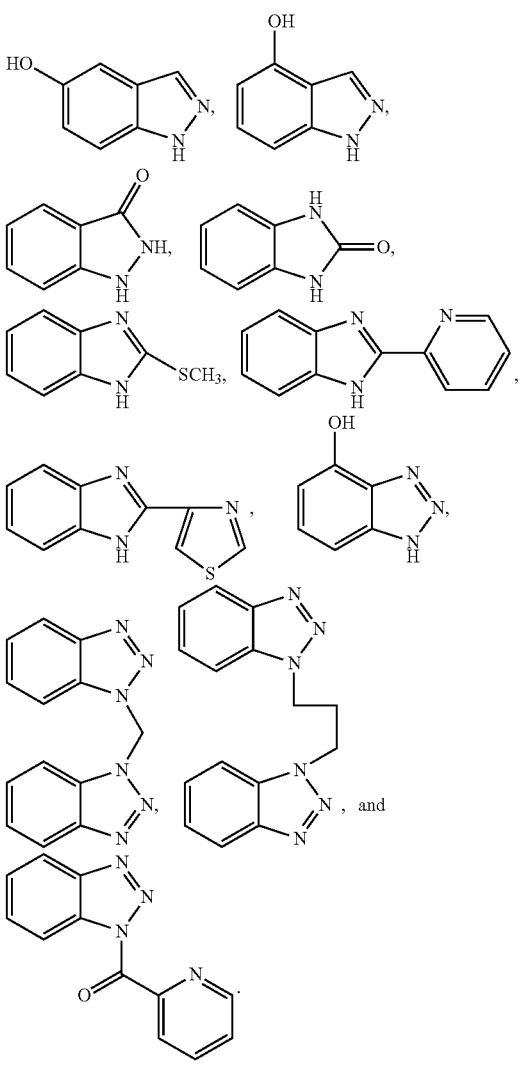

For example, the additive may be at least one selected from the group consisting

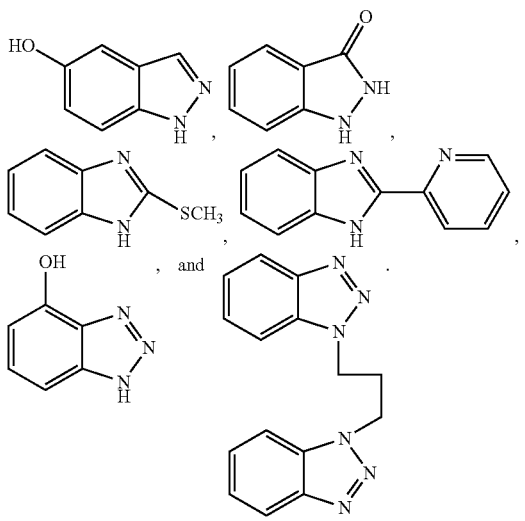

The amount of the additive may be in the range of about 0.005 to about 10 wt %, for example, about 0.01 to 5 wt %, based on the total weight of the electrolyte. For example, the amount of the additive may be in the range of about 0.01 to about 5 wt % based on the total weight of the electrolyte.

If the amount of the additive is within the range described above, the additive is decomposed in an electrolyte so that a thin conductive film may be formed on a surface of a positive electrode in a state where side reactions of the electrolyte little occurs, whereby cycle lifetime characteristics of a lithium secondary battery may be improved.

The lithium salt may be, for example, $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ where x and y are natural numbers, LiCl, LiI, lithium bisoxalate borate, or a combination thereof.

The lithium salt used in the electrolyte for a lithium secondary battery is dissolved in an organic solvent and acts as a lithium-ion source, thereby enabling operation of a lithium secondary battery, and promoting transfer of lithium ions between a positive electrode and a negative electrode. The lithium salt may be any one of the materials that are commercially used in a lithium battery.

The lithium salt may also be used as a supporting electrolytic salt. The concentration of the lithium salt may be within a concentration range generally used in the art. For example, the concentration of the lithium salt in the electrolyte may be in the range of about 0.1 to about 2.0 M. If the concentration of the lithium salt is within the range described above, the concentration of the electrolyte may be appropriately maintained to improve performance of the electrolyte and the viscosity of the electrolyte may be appropriately maintained to improve the mobility of lithium ions.

Examples of the non-aqueous organic solvent include a carbonate-based solvent, an ester-based solvent, an ether-based solvent, a ketone-based solvent, an alcohol-based solvent, a non-protonic solvent, and combinations thereof.

The non-aqueous organic solvent included in the electrolyte may act as a medium through which ions participating in an electrochemical reaction of a battery can migrate. The non-aqueous organic solvent may be any one of various materials that are commercially used in the art.

Examples of the carbonate-based solvent include dimethyl carbonate (DMC), diethyl carbonate (DEC), di-n-propyl carbonate (DPC), methyl n-propyl carbonate (MPC), ethyl n-propyl carbonate (EPC), ethyl methyl carbonate (methyl ethyl carbonate, EMC or MEC), ethylene carbonate (EC), propylene carbonate (PC), and butylene carbonate (BC). Examples of the ester-based solvent include methyl acetate, ethyl acetate, n-propyl acetate, t-butyl acetate, methyl n-propionate, ethyl-n-propionate, γ-butyrolactone, 5-decanolide, Γ-valerolactone, dl-mevalonolactone, and ε-caprolactone. Examples of the ether-based solvent include dibutyl ether, tetraglyme, diglyme, dimethoxyethane, 2-methyl tetrahydrofuran, and tetrahydrofuran. Examples of the ketone-based solvent include cyclohexanone.

Examples of the alcohol-based solvent include ethyl alcohol and isopropyl alcohol. Examples of the non-protonic solvent include nitriles represented by R—CN (where R is a linear, branched, or cyclic hydrocarbonyl group having 2 to 20 carbon atoms, and R may have a double bond aromatic ring or an ether bond); amides such as dimethyl formamide; dioxolanes such as 1,3-dioxolane; and sulfolanes.

The non-aqueous organic solvents may be used alone or more than two kinds thereof may be used in combination. If more than two kinds of the non-aqueous organic solvents are used in combination, the mixed volume ratio may be appropriately adjusted according to the desired performance of the battery to be manufactured and may be known to one of ordinary skill in the art.

Also, if the carbonate-based solvent is used, a cyclic carbonate and a chain carbonate may be used in combination. In this case, the volumetric ratio of the cyclic carbonate to the chain carbonate may be in the range of about 1:1 to about 1:9. If the volumetric ratio of the cyclic carbonate to the chain carbonate is within this range, an electrolyte including the carbonate-based solvent has good performance.

The non-aqueous organic solvent may further include, in addition to the carbonate-based solvent, an aromatic hydrocarbon-based organic solvent. In this regard, the carbonate-based solvent may be mixed with the aromatic hydrocarbon-based organic solvent in a volumetric ratio of about 1:1 to about 30:1.

The aromatic hydrocarbon-based organic solvent may be an aromatic hydrocarbon-based compound represented by Formula 3 below:

<Formula 3>

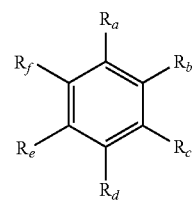

wherein $R_a$ through $R_f$ are each independently hydrogen, a halogen atom, a C1 to C10 alkyl group, a haloalkyl group, or combinations thereof Examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, 2-fluorotoluene, 3-fluorotoluene, 4-fluorotoluene, 2,3-difluorotoluene, 2,4-difluorotoluene, 2,5-difluorotoluene, ,2,3,4-trifluorotoluene, 2,3,5-trifluorotoluene, 2-chlorotoluene, 3-chlorotoluene, 4-chlorotoluene, 2,3-dichlorotoluene, 2,4-dichlorotoluene, 2,5-dichlorotoluene, 2,3,4-trichlorotoluene, 2,3,5-trichlorotoluene, 2-iodotoluene, 3-iodotoluene, 4-iodotoluene, 2,3-diiodotoluene, 2,4-diiodotoluene, 2,5-diiodotoluene, 2,3,4-triiodotoluene, 2,3,5-triiodotoluene, o-xylene, m-xylene, p-xylene, and combinations thereof.

A lithium secondary battery including the electrolyte described above will now be described in detail.

According to another embodiment of the present invention, a lithium secondary battery includes a positive electrode including a positive active material into or from which lithium ions are intercalated or deintercalated; a negative electrode including an negative active material into or from which lithium ions are intercalated or deintercalated; and an electrolyte interposed between the positive electrode and the negative electrode, wherein the electrolyte includes a lithium salt, a non-aqueous organic solvent, and an additive represented by Formula 1 below:

<Formula 1> wherein $A_1$ to $A_9$ are each, independently,

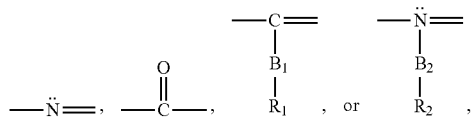

with the proviso that $A_1$ to $A_9$ include at least one of

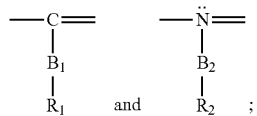

CY1 is a C3-C6 aromatic ring, and CY2 is a C3-C5 aromatic or non-aromatic ring;

$B_1$ and $B_2$ are each independently a single bond,

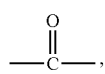

or a C1-C5 alkylene group; and $R_1$ and $R_2$ are each independently hydrogen, a halogen group, a cyano group, a hydroxyl group, —C(=O)$R_a$, —C(=O)O$R_a$, —OCO(O$R_a$), —C=N($R_a$), —S$R_a$, —S(=O)$R_a$, —S(=O)$_2R_a$, —P$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or combinations thereof, wherein $R_a$ is hydrogen, a C1-C10 alkyl group, or a C6-C20 aryl group, with the proviso that at least one of $R_1$ and $R_2$ includes a polar functional group selected from the group consisting of a halogen group, a hydroxyl group, —C(=O)$R_a$, —C(=O)O$R_a$, —OCO(O$R_a$), C=N($R_a$), —S$R_a$, —P$R_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group.

The additive of Formula 1 may be a benzazole-based compound having a polar functional group or derivatives thereof. Examples of the benzazole-based compound include an indazole-based compound, a benzimidazole-based compound, and a benzotriazole-based compound.

The additive of Formula 1 is oxidized before the non-aqueous organic solvent is oxidized because it has a lower oxidation potential than that of the non-aqueous organic solvent, thereby forming a film on a surface of a positive electrode. Thus, oxidation of the electrolyte on the surface of the positive electrode may be prevented.

In addition, the additive of Formula 1 includes a nitrogen atom having non-covalent electron pairs in a heterocyclic ring and a polar functional group having non-covalent electron pairs with an electron donating ability, and thus has a core part with a reduced oxidation potential, thereby forming a thin film when oxidized. Also, the additive of Formula 1 can provide a path for smoothly transferring lithium ions of the electrolyte, whereby a lithium secondary battery with improved lifetime characteristics may be obtained.

The film formed on the surface of the positive electrode suppresses additional electrolyte side reactions and elution of metal ions even when a battery is exposed to a high temperature, thereby contributing to improved high temperature conservation characteristics and lifetime characteristics.

When a battery with improved high-temperature lifetime characteristics is used in an electric vehicle, the battery makes it possible for the electric vehicle to endure harsh environments, and an improvement in high-temperature conservation characteristics makes a battery including the electrolyte be more suitable for power storage applications that are likely to be exposed to high temperature.

The electrolyte may be represented by Formula 2 below:

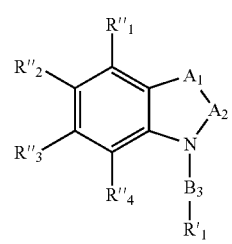

<Formula 2> wherein $A_1$ and $A_2$ are each, independently,

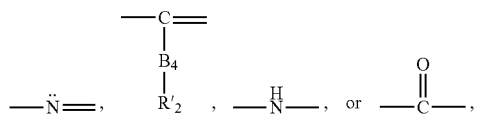

with the proviso that $A_1$ and $A_2$ include at least one of

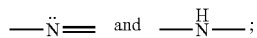

$B_3$ and $B_4$ are each independently a single bond,

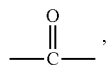

or a C1-C5 alkylene group; and $R'_1$, $R''_1$, $R''_2$, $R''_3$, and $R''_4$ are each independently hydrogen, a halogen group, a hydroxyl group, a cyano group, $-C(=O)R_a$, $-C(=O)OR_a$, $-OCO(OR_a)$, $-C=N(R_a)$, $-SR_a$, $-S(=O)R_a$, $-S(=O)_2R_a$, $-PR_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or a combination thereof, wherein $R_a$ is hydrogen, a C1-C10 alkyl group, or a C6-C20 aryl group, with the proviso that at least one of $R'_1$, $R''_1$, $R''_2$, $R''_3$, and $R''_4$ includes a polar functional group selected from the group consisting of a halogen group, a hydroxyl group, $-C(=O)R_a$, $-C(=O)OR_a$, $-OCO(OR_a)$, $C=N(R_a)$, $-SR_a$, $-PR_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group.

The substituents used in Formula 2 are the same as defined in Formula 1.

The additive of Formula 2 may be a benzazole-based compound. Examples of the benzazole-based compound include an indazole-based compound, a benzimidazole-based compound, and a benzotriazole-based compound.

The additive of Formula 2 includes a nitrogen atom having non-covalent electron pairs in a heterocyclic ring and a polar functional group having non-covalent electron pairs with an electron-donating ability, and thus the additive is oxidized before an electrolyte is oxidized on a surface of a positive electrode, thereby forming a film within a short period of time. Therefore, a lithium secondary battery including the electrolyte including the additive may have improved high temperature lifetime characteristics and high temperature conservation characteristics.

For example, the additive may be at least one selected from the group consisting of

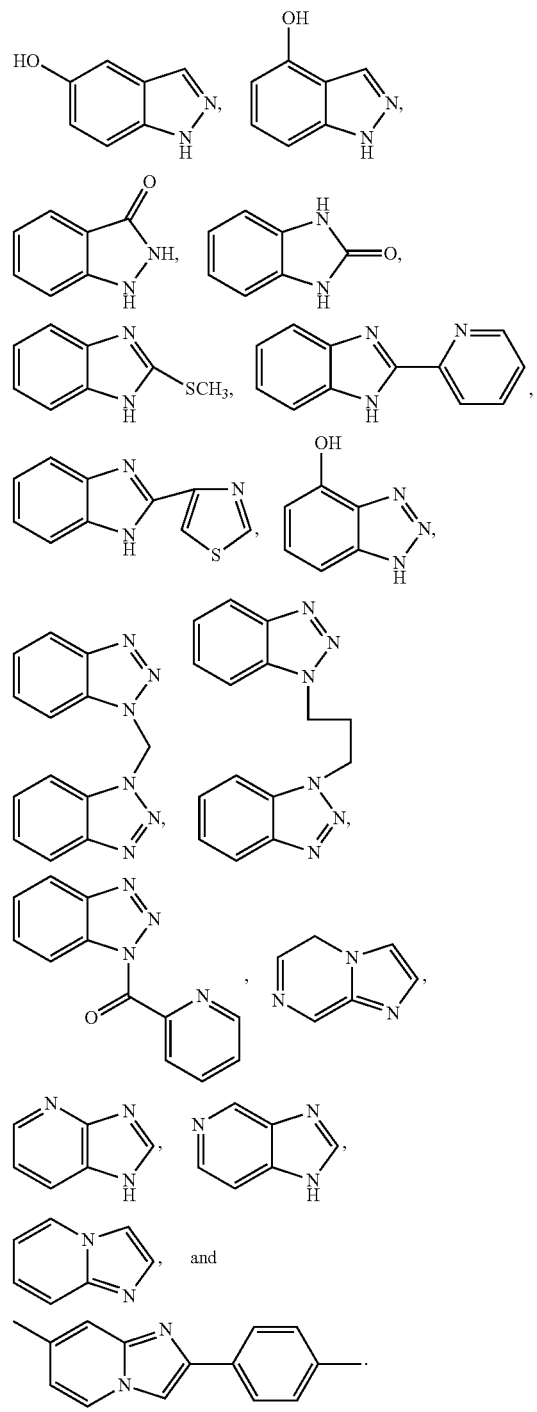

For example, the additive may be at least one selected from the group consisting of

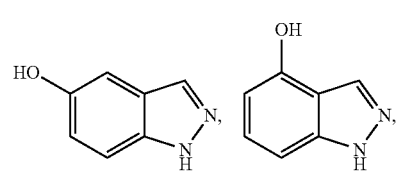

-continued

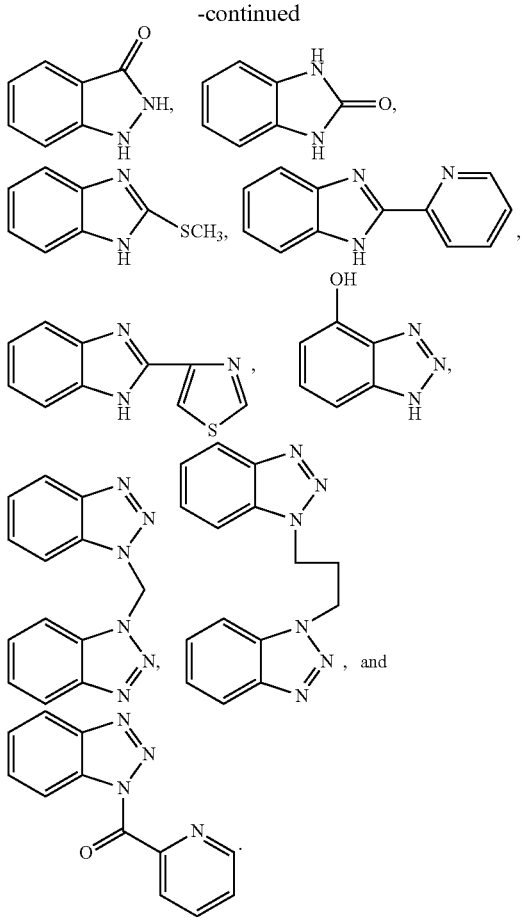

For example, the additive may be at least one selected from the group consisting

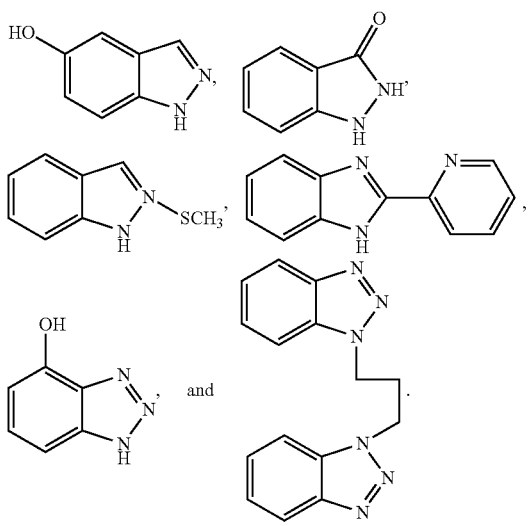

According to another embodiment of the present invention, a lithium secondary battery includes a positive electrode, a negative electrode, and an electrolyte, wherein the electrolyte includes a lithium salt, a non-aqueous organic solvent, and an additive represented by Formula 1 above, and the positive electrode includes a film formed on its surface, wherein the film is partially or fully derived from the additive of the electrolyte.

Thus, even when the lithium secondary battery is charged at a high voltage (e.g., greater than 4.3 V), the lithium secondary battery has excellent capacity retention characteristics. In addition, the lithium secondary battery has excellent lifetime characteristics and excellent capacity conservation characteristics.

The thickness of the film may be in the range of about 0.5 nm to about 100 nm, for example, about 0.1 nm to about 80 nm, for example, about 0.5 nm to 50 nm.

When the thickness of the film formed on a surface of a positive electrode of the lithium secondary battery is within the range described above, the film may not adversely affect migration of lithium ions and oxidation of the electrolyte on the surface of the positive electrode may be effectively prevented.

The amount of the additive may be in the range of about 0.005 to about 10 wt %, for example, about 0.01 to 5 wt %, based on the total weight of the electrolyte.

If the amount of the additive is within the ranges described above, the additive is dissolved in an electrolyte so that a thin conductive film may be formed on a surface of a positive electrode in a state where side reactions of the electrolyte little occur, whereby cycle lifetime characteristics of a lithium secondary battery may be improved.

Figure 3:
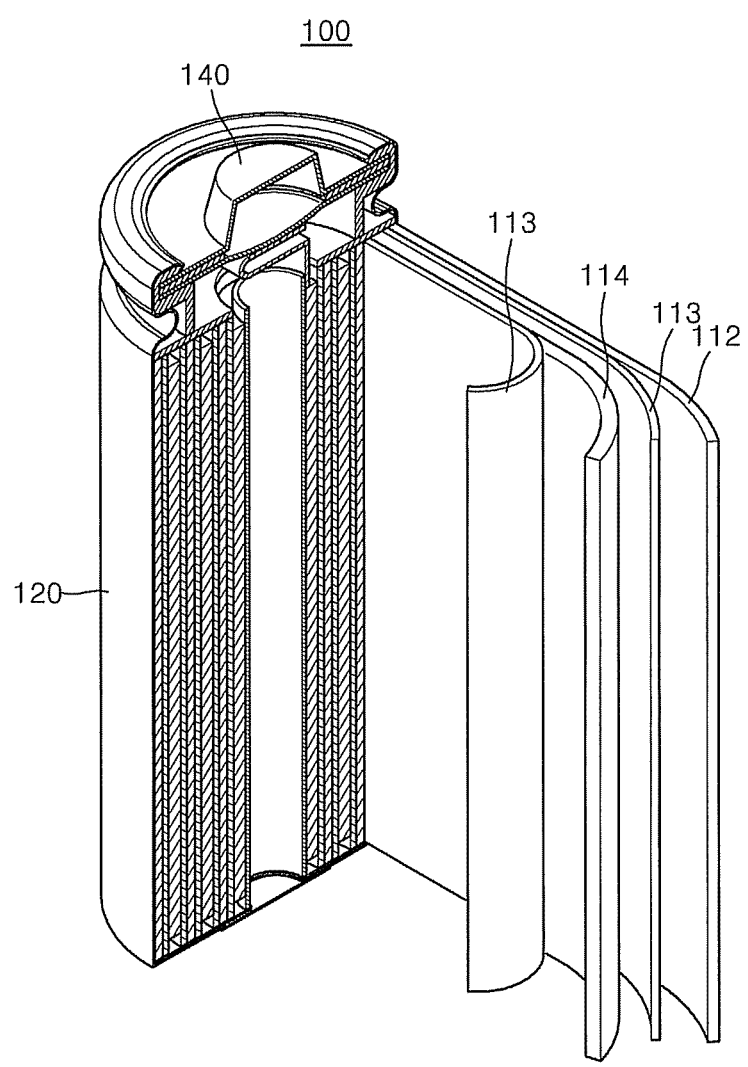
FIG. 3 is an exploded perspective view of a lithium secondary battery according to an embodiment of the present invention.

FIG. 3 is an exploded perspective view of a lithium secondary battery 100 according to an embodiment. The lithium secondary battery of FIG. 3 is cylindrical, but the shape of the lithium secondary battery is not limited thereto. For example, the lithium secondary battery may have a rectangular shape or a pouch shape.

Lithium secondary batteries can be classified as a lithium ion battery, a lithium ion polymer battery, or a lithium polymer battery, according to the separator and the electrolyte; can be classified as a cylindrical battery, a rectangular battery, a coin-type battery, or a pouch-type battery, according to the shape of a battery; and can be classified as a bulk-type battery or a film-type battery, according to the size of the battery. The type of a lithium secondary battery according to an embodiment of the present invention is not limited. The structures and preparation methods of the batteries described above are known in the art and thus, will not be described in detail herein.

Referring to FIG. 3, the lithium secondary battery 100 is cylindrical, and mainly includes a negative electrode 112, a positive electrode 114, a separator 113 interposed between the negative electrode 112 and the positive electrode 114, an electrolyte (not shown) with which the negative electrode 112, the positive electrode 114, and the separator 113 are impregnated, a battery container 120, and an encapsulation member 140 for encapsulating the battery container 120. The negative electrode 112, the positive electrode 114, and the separator 113 are sequentially deposited and then wound in a spiral form and then, the wound structure is placed in the battery container 120, thereby manufacturing the lithium secondary battery 100.

The negative electrode 112 includes a current collector and a negative active material layer formed on the current collector, wherein the negative active material layer includes a negative active material. As a current collector for a negative electrode 112, according to the voltage range, a copper, nickel, or SUS current collector may be used. For example, a copper current collector may be used as a current collector for a negative electrode.

The negative active material may be any material that is generally used in the art. For example, examples of the negative active material include lithium metal, a metal material that is alloyable with lithium, a transition metal oxide, a material for doping or undoping lithium, and a material for enabling reversibly intercalating or deintercalating lithium ions.

Examples of the transition metal oxide include vanadium oxide, lithium vanadium oxide, and the like. Examples of the material for enabling doping or undoping lithium include Si; $SiO_x$ (0<x<2); Si-T alloy where T is an alkali metal, an alkali earth metal, a Group XIII element, a Group XIV element, a transition metal, a rare-earth element, or combinations thereof and is not Si; Sn; $SnO_2$; and Sn-Z where Z is an alkali metal, alkali earth metal, a Group XIII element, a Group XIV element, a transition metal, a rare-earth element, and combinations thereof and is not Sn. Also, at least one of the materials for enabling doping or undoping lithium may be used in combination with $SiO_2$. The elements T and Z may be Mg, Ca, Sr, Ba, Sc, Y, Ti, Zr, Hf, V, Nb, Ta, Cr, Mo, W, Re, Fe, Pb, Ru, Os, Rh, Ir, Pd, Pt, Cu, Ag, Au, Zn, Cd, B, Al, Ga, Sn, In, Ti, Ge, P, As, Sb, Bi, S, Se, Te, or combinations thereof.

The material for enabling reversibly intercalating or deintercalating lithium ions may be a carbonaceous material and any one of various carbonaceous negative active materials that are generally used in a lithium ion secondary battery. Examples of the material for enabling reversibly intercalating or deintercalating lithium include crystalline carbon, amorphous carbon, and combinations thereof. Examples of the crystalline carbon include natural graphite and artificial graphite, each of which has an amorphous shape, a plate shape, a flake shape, a spherical shape, or a fiber shape. Examples of the amorphous carbon include soft carbon (low-temperature calcined carbon), hard carbon, meso-phase pitch carbide, and calcined coke.

The negative active material layer may also include a binder, and may further selectively include a conductive agent. The binder may allow negative active material particles to be adhered to each other and the negative active material to be attached to the current collector. Examples of the binder include, but are not limited to, polyvinylalcohol, carboxymethylcellulose, hydroxypropylcellulose, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, and nylon.

The conductive agent provides conductivity to electrodes, and may be any one of various materials that do not cause any chemical change in the lithium secondary battery 100 and are electronically conductive. For example, the conductive agent may be natural graphite, artificial graphite, carbon black, acetylene black, carbon fiber, and metal powder or fiber of copper, nickel, aluminum, or silver. Also, conductive materials such as polyphenylene derivatives may be used in combination. Examples of the current collector include a copper foil, a nickel foil, a stainless steel foil, a titanium foil, nickel foam, copper foam, a polymer substrate coated with a conductive metal, and combinations thereof.

Amounts of the negative active material, the binder, and the conductive agent may be used at the same levels as commercially used in a lithium secondary battery. For example, the mixed weight ratio of the negative active material to the sum of the conductive agent and the binder may be in the range of about 98:2 to about 92:8, and the mixed weight ratio of the conductive agent and the binder may be in the range of about 1:1.5 to about 1:3. However, the ratios are not limited to the above examples.

The positive electrode 114 includes a current collector and a positive active material layer formed on the current collector. The current collector may be formed of Al, but the material for forming the current collector is not limited thereto.

The positive active material may be any one of various materials that are generally used in the art. For example, the positive active material may be a compound that enables reversible intercalation and deintercalation of lithium ions. The positive active material may include one or more composite oxides of lithium and a metal selected from the group consisting of cobalt, manganese, nickel, and combinations thereof. For example, the positive active material may be a compound represented by any one of Formulae: $Li_aA_{1-b}L1_bD_2$ where $0.90 \leq a \leq 1.8$ and $0 \leq b \leq 0.5$; $Li_aE_{1-b}L1_bO_{2-c}D_c$ where $0.90 \leq a \leq 1.8$, $0 \leq b \leq 0.5$, and $0 \leq c \leq 0.05$; $LiE_{2-b}L1_bO_{4-c}D_c$ where $0 \leq b \leq 0.5$ and $0 \leq c \leq 0.05$; $Li_aNi_{1-b-c}Co_bL1_cD_a$ where $0.90 \leq a \leq 1.8$, $0 \leq b \leq 0.5$, $0 \leq c \leq 0.05$, and $0 < a \leq 2$; $Li_aNi_{1-b-c}Co_bL1_aO_{2-a}T1_a$ where $0.90 \leq a \leq 1.8$, $0 \leq b \leq 0.5$, $0 \leq c \leq 0.05$, and $0 < a < 2$; $Li_aNi_{1-b-c}Co_bL1_aO_{2-a}T1_2$ where $0.90 \leq a \leq 1.8$, $0 \leq b \leq 0.5$, $0 \leq c \leq 0.05$, and $0 < a < 2$; $Li_aNi_{1-b-c}Mn_bL1_cD_a$ where $0.90 \leq a \leq 1.8$, $0 \leq b \leq 0.5$, $0 \leq c \leq 0.05$, and $0 < a \leq 2$; $Li_aNi_{1-b-c}Mn_bL1_cO_{2-a}T1_a$ where $0.90 \leq a \leq 1.8$, $0 \leq b \leq 0.5$, $0 \leq c \leq 0.05$, and $0 < a < 2$; $Li_aNi_{1-b-c}Mn_bL1_cO_{2-a}T1_2$ where $0.90 \leq a \leq 1.8$, $0 \leq b \leq 0.5$, $0 \leq c \leq 0.05$, and $0 < a < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiY1O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

Examples of the positive active material include $LiCoO_2$, $LiNi_{1-x}Co_xO_2$ where $0 \leq x < 1$, $Li_{1-x}M_xO_2$ (M is Mn or Fe, 0.03<x<0.1), $Li[Ni_xCo_{1-2x}Mn_x]O_2$ (0<x<0.5), $Li[Ni_xMn_x]O_2$ where $0<x \leq 0.5$, $Li_{1-x}(M)_{1-y}O_z$ (0<x≤1, 0≤y<1, M is a transition metal), $LiM_2O_4$ (M is Ti, V, or Mn), $LiM_xMn_{2-x}O_4$ (M is a transition metal), $LiFePO_4$, $LiMPO_4$ (M is Mn, Co, or Ni). $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$-$Mn_yV_2O_5$, $\delta$-$NH_4V_4O_{10}$, $Mn_{0.8}V_7O_{16}$, $LiV_3O_8$, $Cu_xV_2O_5$, $Cr_xV_6O_{13}$, $M_2(XO_4)_3$ (M is a transition metal, X is S, P, As, Mo, or W), and $Li_3M_2(PO_4)_3$ (M is Fe, V, or Ti).

In particular, the positive active material may be $Li_{1-x}(M)_{1-z}O_2$ where $0.05 \leq x \leq 0.2$ and M is a transition metal. Examples of the transition metal M include, but are not limited to, Ni, Co, Mn, Fe, and Ti.

Since a weight ratio of lithium ions to the transition metal M is large in the positive active material, the capacity of a lithium secondary battery including a positive electrode including the positive active material may be more improved.

In the formulae above, A is Ni, Co, Mn, or combinations thereof; L1 is Al, Ni, Co, Mn, Cr, Fe, Mg, Sr, V, a rare-earth element, or combinations thereof; D is O, F, S, P, or combinations thereof; E is Co, Mn, or combinations thereof; T1 is F, S, P, or combinations thereof; G is Al, Cr, Mn, Fe, Mg, La, Ce, Sr, V, or combinations thereof; Q is Ti, Mo, Mn, or combinations thereof; Y1 is Cr, V, Fe, Sc, Y, or combinations thereof; and J is V, Cr, Mn, Co, Ni, Cu, or combinations thereof.

The compounds described above may have a coating layer at their surfaces. Alternatively, the compounds may be used in combination with a compound including a coating layer. The coating layer may include a coating element compound, such as an oxide of a coating element, a hydroxide of a coating element, an oxyhydroxide of a coating element, an oxycarbonate of a coating element, or a hydroxycarbonate of a coating element. The coating element compounds may be amorphous or crystalline. The coating element included in the coating layer may be Mg, Al, Co, K, Na, Ca, Si, Ti, V, Sn, Ge, Ga, B, As, Zr, or mixtures thereof. A coating layer may be formed by using the coating elements in the aforementioned compounds by using any one of various methods that do not adversely affect physical properties of a positive active material (e.g., spray coating or immersion). The coating layer formation methods may be obvious to one of ordinary skill in the art and thus, will not be described in detail.

The operating potential of the positive active material may be 4.5V±0.5 V, for example, 5V±0.5V.

The positive active material layer may further include a binder and a conductive agent. The binder may allow positive active material particles to be adhered to each other and the positive active material to be attached to the current collector. Examples of the binder include, but are not limited to, polyvinylalcohol, carboxymethylcellulose, hydroxypropylcellulose, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, and nylon.

The conductive agent provides conductivity to electrodes, and may be any one of various materials that do not cause any chemical change in the lithium secondary battery 100 and are electronically conductive. For example, the conductive agent may be natural graphite, artificial graphite, carbon black, acetylene black, carbon fiber, or metal powder or fiber of copper, nickel, aluminum, or silver. Also, a conductive material such as polyphenylene derivative may be used alone or in combination of at least one of the conductive materials.

Amounts of the positive active material, the binder, and the conductive agent may be used at the same levels as commercially used in a lithium secondary battery. For example, the mixed weight ratio of the positive active material to the sum of the conductive agent and the binder may be in the range of about 98:2 to about 92:8, and the mixed weight ratio of the conductive agent to the binder may be in the range of about 1:1.5 to about 1:3. However, the mixed weight ratios may not be limited to the above examples.

In order to form an electrode such as the negative electrode 112 and the positive electrode 114, an active material, a binder, and a conductive agent are mixed in a solvent to prepare an active material composition and a current collector is applied to the active material composition. This electrode manufacturing method is known in the art and, thus, will not be described in details herein. The solvent may be N-methylpyrrolidone, but is not limited thereto.

According to the type of a lithium secondary battery, a separator may be interposed between a negative electrode and a positive electrode. The separator may be a single layer of polyethylene, polypropylene, or polyvinylidene fluoride, or multiple layers of at least two of these materials. Also, the separator may be a mixed multi-layer, such as a polyethylene/polypropylene layer, a polyethylene/polypropylene/polyethylene layer, or a polypropylene/polyethylene/polypropylene layer.

One or more embodiments will now be described in further detail with reference to the following examples. These examples are for illustrative purposes only and are not intended to limit the scope of the one or more embodiments. In addition, a detailed description of technical features that are known to one of ordinary skill in the art is not provided herein.

EXAMPLES

Example 1

Preparation of Electrolyte for Lithium Secondary Battery

An electrolyte for a lithium secondary battery was prepared by adding 0.1 wt % of 5-hydroxyindazole represented by Formula 4 below as an additive and 1.3 M $LiPF_6$ as a lithium salt to a non-aqueous organic solvent including 30 volume % of ethylene carbonate, 50 volume % of diethyl carbonate, and 20 volume % of ethyl methyl carbonate.

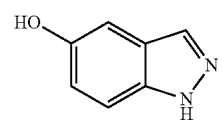

<Formula 4>

Example 2

Preparation of Electrolyte for Lithium Secondary Battery

An electrolyte for a lithium secondary battery was prepared in the same manner as in Example 1, except that 0.1 wt % of 3-indazolinone represented by Formula 5 below was used as an additive instead of 5-hydroxyindazole of Formula 4.

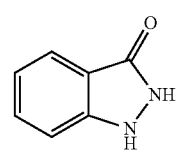

<Formula 5>

Example 3

Preparation of Electrolyte for Lithium Secondary Battery

An electrolyte for a lithium secondary battery was prepared in the same manner as in Example 1, except that 0.1 wt % of 2-(methylthio)benzimidazole represented by Formula 6 below was used as an additive instead of 5-hydroxyindazole of Formula 4.

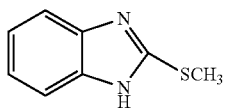

<Formula 6>

Example 4

Preparation of Electrolyte for Lithium Secondary Battery

An electrolyte for a lithium secondary battery was prepared in the same manner as in Example 1, except that 0.1 wt % of 2-(2-pyridyl)benzimidazole represented by Formula 7 below was used as an additive instead of 5-hydroxyindazole of Formula 4.

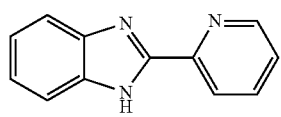

<Formula 7>

Example 5

Preparation of Electrolyte for Lithium Secondary Battery

An electrolyte for a lithium secondary battery was prepared in the same manner as in Example 1, except that 0.1 wt % of 4-hydroxy-1H-benzotriazole represented by Formula 8 below was used as an additive instead of 5-hydroxyindazole of Formula 4.

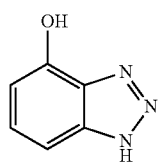

<Formula 8>

Example 6

Preparation of Electrolyte for Lithium Secondary Battery

An electrolyte for a lithium secondary battery was prepared in the same manner as in Example 1, except that 0.1 wt % of 1,1'-trimethylenebis(benzotriazole) represented by Formula 9 below was used as an additive instead of 5-hydroxyindazole of Formula 4.

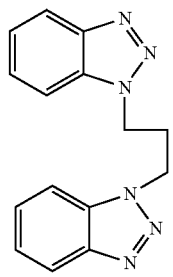

<Formula 9>

Comparative Example 1

Preparation of Electrolyte for Lithium Secondary Battery

An electrolyte for a lithium secondary battery was prepared by adding 1.3 M $LiPF_6$ as a lithium salt to a non-aqueous organic solvent including 30 volume % of ethylene carbonate, 50 volume % of diethyl carbonate, and 20 volume % of ethyl methyl carbonate, not using an additive.

Comparative Example 2

Preparation of Electrolyte for Lithium Secondary Battery

An electrolyte for a lithium secondary battery was prepared in the same manner as in Example 1, except that 0.1 wt % of inden represented by Formula 10 below was used as an additive instead of 5-hydroxyindazole of Formula 4.

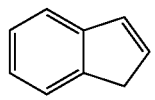

<Formula 10>

Comparative Example 3

Preparation of Electrolyte for Lithium Secondary Battery

An electrolyte for a lithium secondary battery was prepared in the same manner as in Example 1, except that 0.1 wt % of indazole represented by Formula 11 below was used as an additive instead of 5-hydroxyindazole of Formula 4.

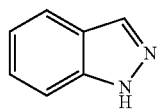

<Formula 11>

Comparative Example 4

Preparation of Electrolyte for Lithium Secondary Battery

An electrolyte for a lithium secondary battery was prepared in the same manner as in Example 1, except that 0.1 wt % of benzimidazole represented by Formula 12 below was used as an additive instead of 5-hydroxyindazole of Formula 4.

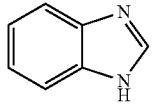

<Formula 12>

Comparative Example 5

Preparation of Electrolyte for Lithium Secondary Battery

An electrolyte for a lithium secondary battery was prepared in the same manner as in Example 1, except that 0.1 wt % of 2-methylbenzimidazole represented by Formula 13 below was used as an additive instead of 5-hydroxyindazole of Formula 4.

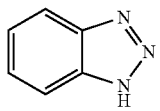

<Formula 13>

Comparative Example 6

Preparation of Electrolyte for Lithium Secondary Battery

An electrolyte for a lithium secondary battery was prepared in the same manner as in Example 1, except that 0.1 wt % of 1H-benzotriazole represented by Formula 14 below was used as an additive instead of 5-hydroxyindazole of Formula 4.

<Formula 14>

Comparative Example 7

Preparation of Electrolyte for Lithium Secondary Battery

An electrolyte for a lithium secondary battery was prepared in the same manner as in Example 1, except that 0.1 wt % of 5-methylbenzotriazole represented by Formula 15 below was used as an additive instead of 5-hydroxyindazole of Formula 4.

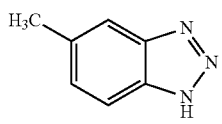

<Formula 15>

Example 7

Manufacturing of Lithium Secondary Battery $Li_{1+x}(Ni,Co,Mn)_{1-x}O_2$ ($0.05 \leq x \leq 0.2$) powder as a positive electrode material, a binder prepared by dissolving 5 wt % of polyvinylidene fluoride (PVdF) in N-methylpyrrolidone (NMP), and a conductive agent (acetylene black) were added in a weight ratio of 92:4:4 to an agate mortar and mixed to prepare a slurry. The slurry was coated by bar coating on an aluminum foil having a thickness of 15 μm. The resultant product was placed in an oven at 90° C. and dried for about 2 hours to evaporate NMP, and then placed in a vacuum oven at 120° C. and dried for about 2 hours to completely evaporate NMP. Then, the resultant product was pressed and punched to obtain a positive electrode for a coin cell having a thickness of 60 μm.

A lithium secondary battery was manufactured using the positive electrode having a diameter of 1.5 cm, a graphite negative electrode having a diameter of 1.6 cm, a polyethylene separator, and the electrolyte for a lithium secondary battery prepared according to Example 1.

Example 8

Manufacturing of Lithium Secondary Battery

A lithium secondary battery was manufactured in the same manner as in Example 7, except that the electrolyte prepared according to Example 2 was used.

Example 9

Manufacturing of Lithium Secondary Battery

A lithium secondary battery was manufactured in the same manner as in Example 7, except that the electrolyte prepared according to Example 3 was used.

Example 10

Manufacturing of Lithium Secondary Battery

A lithium secondary battery was manufactured in the same manner as in Example 7, except that the electrolyte prepared according to Example 4 was used.

Example 11

Manufacturing of Lithium Secondary Battery

A lithium secondary battery was manufactured in the same manner as in Example 7, except that the electrolyte prepared according to Example 5 was used.

Example 12

Manufacturing of Lithium Secondary Battery

A lithium secondary battery was manufactured in the same manner as in Example 7, except that the electrolyte prepared according to Example 6 was used.

Comparative Example 8

Manufacturing of Lithium Secondary Battery

A lithium secondary battery was manufactured in the same manner as in Example 7, except that the electrolyte prepared according to Comparative Example 1 was used.

Comparative Example 9

Manufacturing of Lithium Secondary Battery

A lithium secondary battery was manufactured in the same manner as in Example 7, except that the electrolyte prepared according to Comparative Example 2 was used.

Comparative Example 10

Manufacturing of Lithium Secondary Battery

A lithium secondary battery was manufactured in the same manner as in Example 7, except that the electrolyte prepared according to Comparative Example 3 was used.

Comparative Example 11

Manufacturing of Lithium Secondary Battery

A lithium secondary battery was manufactured in the same manner as in Example 7, except that the electrolyte prepared according to Comparative Example 4 was used.

Comparative Example 12

Manufacturing of Lithium Secondary Battery

A lithium secondary battery was manufactured in the same manner as in Example 7, except that the electrolyte prepared according to Comparative Example 5 was used.

Comparative Example 13

Manufacturing of Lithium Secondary Battery

A lithium secondary battery was manufactured in the same manner as in Example 7, except that the electrolyte prepared according to Comparative Example 6 was used.

Comparative Example 14

Manufacturing of Lithium Secondary Battery

A lithium secondary battery was manufactured in the same manner as in Example 7, except that the electrolyte prepared according to Comparative Example 7 was used.

(Cell Performance Tests)

Evaluation Example 1

Evaluation of Lithium Ionic Conductivity

Figure 2:
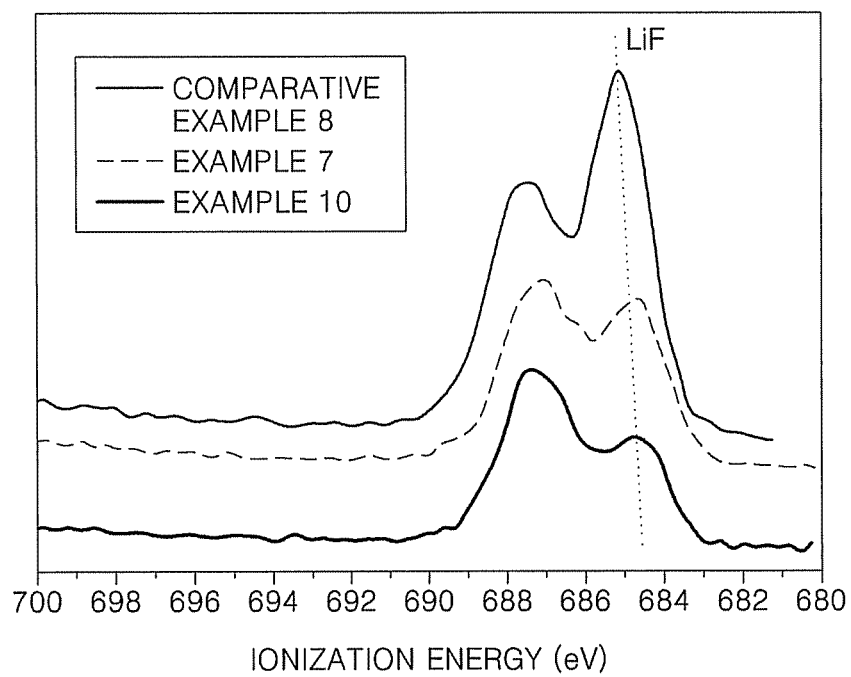
FIG. 2 is a graph showing X-ray photoelectron spectroscopy (XPS) results of a film analyzed after lithium secondary batteries including electrolytes prepared according to Examples 7 and 8 and Comparative Example 1 undergo charging and discharging for formation twice and standard charging once and are then disassembled.

Lithium secondary batteries manufactured according to Examples 7 and 10 and Comparative Example 8 underwent charging and discharging twice at room temperature for formation of a film. In the formation process, the lithium secondary batteries were charged with a constant current of 0.2 C until the voltage reached 4.4 V and then charged at a constant voltage until the current reached 0.05 C. Then, discharging was performed with a constant current of 0.2 C until the voltage reached 2.8 V. The lithium secondary batteries that underwent the charging and discharging for formation were charged with a current of 0.5 C in the method described above and then disassembled. Then, evaluation was performed on the film formed on the surface of the positive electrode by using XPS (Physical Electronics Quantom 2000) to confirm whether the lithium ionic conductivity thereof was improved, and the results are illustrated in FIG. 2. As illustrated in FIG. 2, a peak of LiF, which is a non-conductive lithium, was observed between 684 eV to 686 eV.

The film formed on the surface of the positive electrode by using each of the electrolytes that included Examples 7 and 10 included less of an amount of LiF than the film formed on the surface of the positive electrode by using the electrolyte included Comparative Example 8. From the results, it was confirmed that the films formed on the surface of the positive electrode by using the electrolytes included Examples 7 and 10 had improved lithium ionic conductivity.

Evaluation Example 2-1

High Temperature Lifetime Characteristics 1 of Lithium Secondary Battery

Lithium secondary batteries manufactured according to Examples 7 through 10 and Comparative Examples 8 through 12 underwent charging and discharging for formation twice at room temperature. In the formation process, the lithium secondary batteries were charged with a constant current of 0.2 C until the voltage reached 4.4 V and then charged at a constant voltage of 4.4 V until the current reached 0.05 C. Then, discharging was performed with a constant current of 0.2 C until the voltage reached 2.8 V. The lithium secondary batteries that underwent the charging and discharging for formation were charged with a current of 0.5 C in the method described above and then discharged at a current of 0.2 C until the voltage reached 2.8 V. The charging and discharging conditions in this case were used as reference charging and discharging conditions, and the discharge capacity in this case was used as a reference capacity.

Then, to evaluate high temperature lifetime characteristics, the lithium secondary batteries were charged with a current of 1 C in a constant-temperature chamber at 45° C. in the method described above and then, discharged with a current of 1 C until the voltage reached 2.8 V. Then, the discharge capacity (discharge capacity at the $1^{st}$ cycle) was measured. The charging and discharging processes were repeatedly performed to evaluate cycle lifetime. The discharge capacity of the lithium secondary batteries at each cycle and the discharge capacity thereof at the $100^{th}$ cycle were measured, and a cycle retention rate was calculated therefrom. The cycle retention rate (%) is calculated using Equation 1 below:

$$\text{Cycle retention rate (\%)} = \text{discharge capacity at } 100^{th} \text{ cycle/discharge capacity at } 2^{nd} \text{ cycle} \quad \text{[Equation 1]}$$

Figure 4A:
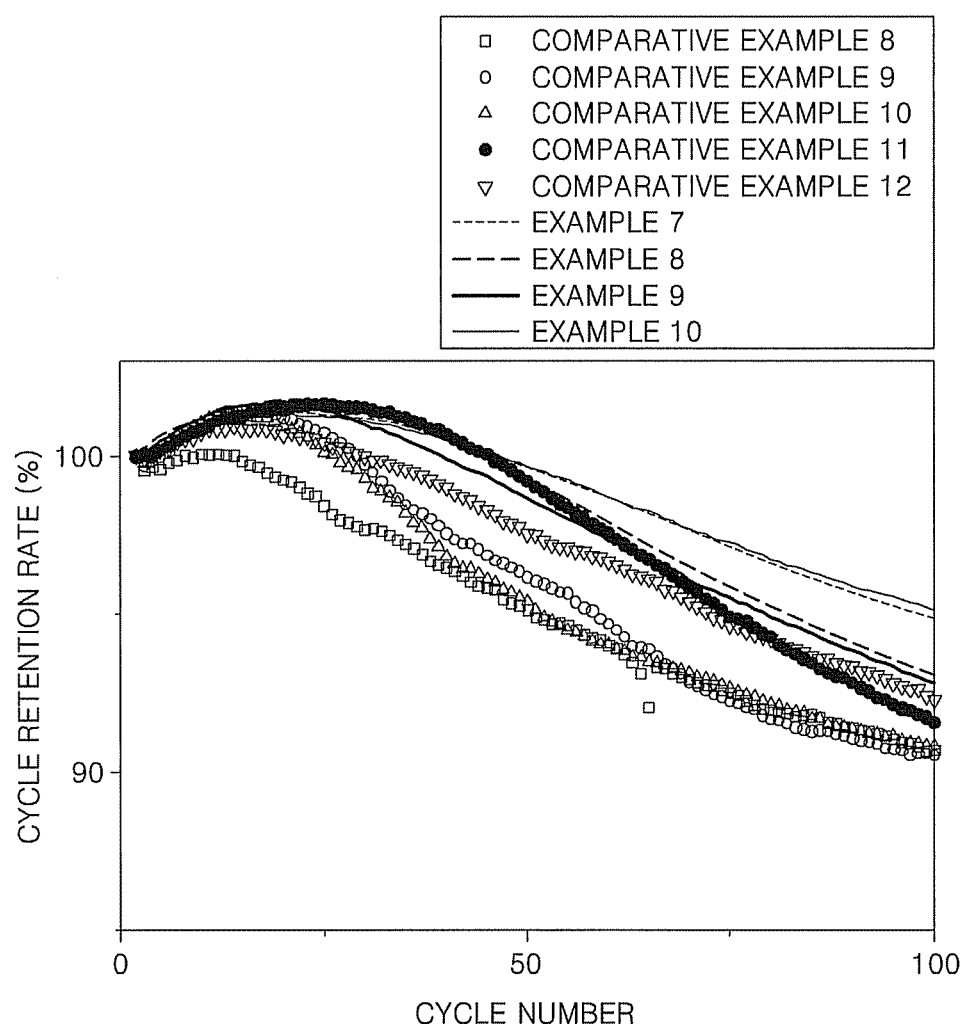
FIG. 4A is a graph showing high temperature lifetime characteristics at 45° C. of lithium secondary batteries manufactured according to Examples 7-10 and Comparative Examples 8-12.

The cycle retention rate calculated as described above is shown in Table 1 below and FIG. 4A.

TABLE 1

|  | Discharge capacity at 1st cycle (mAh) | Discharge capacity at 100th cycle (mAh) | Cycle retention rate(%) |
|---|---|---|---|
| Example 7 | 2.67 | 2.53 | 94.8 |
| Example 8 | 2.62 | 2.44 | 93.1 |
| Example 9 | 2.56 | 2.38 | 93.0 |
| Example 10 | 2.66 | 2.53 | 95.1 |
| Comparative Example 8 | 2.59 | 2.35 | 90.7 |
| Comparative Example 9 | 2.52 | 2.28 | 90.5 |
| Comparative Example 10 | 2.48 | 2.26 | 91.1 |
| Comparative Example 11 | 2.50 | 2.29 | 91.6 |
| Comparative Example 12 | 2.58 | 2.38 | 92.2 |

Evaluation Example 2-2

High Temperature Lifetime Characteristics 2 of Lithium Secondary Battery

Lithium secondary batteries manufactured according to Examples 11 and 12 and Comparative Examples 8, 13, and 14 underwent charging and discharging for formation twice at room temperature in the same manner as in Evaluation Example 2-1.

Then, to evaluate high temperature lifetime characteristics, the lithium secondary batteries were charged with a current of 1 C in a constant-temperature chamber at 60° C. in the method described above and then, discharged with a current of 1 C until the voltage reached 2.8 V. Then, the discharge capacity (discharge capacity at 1st cycle) was measured. The charging and discharging processes were repeatedly performed to evaluate cycle lifetime. The discharge capacity of the lithium secondary batteries at each cycle and the discharge capacity thereof at 100th cycle were measured, and a cycle retention rate was calculated therefrom. The cycle retention rate (%) is calculated using Equation 1 above.

The cycle retention rate calculated as described above is shown in Table 2 below and FIG. 4B.

TABLE 2

|  | Discharge capacity at 1st cycle (mAh) | Discharge capacity at 100th cycle (mAh) | Cycle retention rate(%) |
|---|---|---|---|
| Example 11 | 2.66 | 2.43 | 91.5 |
| Example 12 | 2.53 | 2.25 | 89.0 |
| Comparative Example 8 | 2.60 | 2.27 | 87.4 |
| Comparative Example 13 | 2.69 | 2.33 | 86.4 |
| Comparative Example 14 | 2.56 | 2.2 | 85.9 |

Figure 4B:
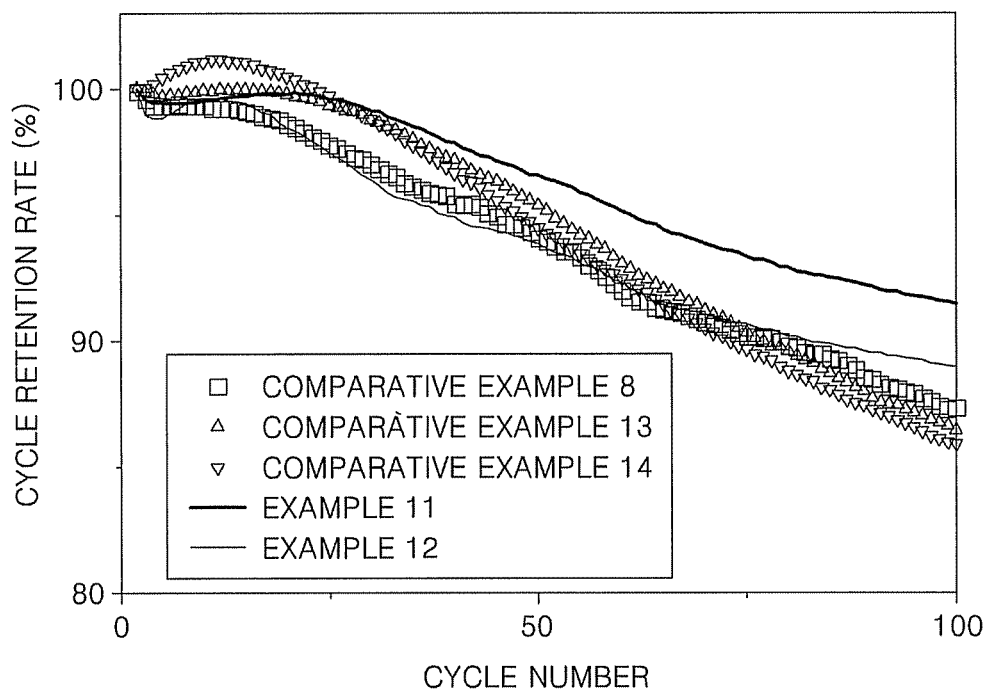
FIG. 4B is a graph showing high temperature lifetime characteristics at 60° C. of lithium secondary batteries manufactured according to Examples 11 and 12 and Comparative Examples 8 and 13-14.

Referring to Table 1 and FIG. 4B, the lithium secondary batteries manufactured according to Examples 7 through 12 including an indazole-based additive or a benzimidazole-based additive that has a polar functional group have improved cycle retention rate as compared with the lithium secondary batteries manufactured according to Comparative Examples 8 through 12 not including an additive or not having a polar functional group. Therefore, it is confirmed that the lithium secondary batteries of Examples 7 through 10 have longer high temperature lifetime than that of each of the lithium secondary batteries of Comparative Examples 8 through 12.

In addition, referring to Table 2 and FIG. 4B, the lithium secondary batteries of Examples 11 and 12 including a benzotriazole-based additive having a polar functional group have improved cycle retention rate as compared to the lithium secondary batteries of Comparative Examples 8, 13, and 14 not including an additive or not having a polar functional group. Therefore, it is confirmed that the lithium secondary batteries of Examples 11 and 12 have longer high temperature lifetime than that of each of the lithium secondary batteries of Comparative Examples 8, 13, and 14.

Evaluation Example 3

High Temperature Conservation Characteristics of Lithium Secondary Battery

The lithium secondary batteries of Examples 7 and 10 and Comparative Example 8, which had undergone twice charging and discharging processes for formation and a standard charging and discharging process, were charged under charging conditions of standard charging and discharging conditions, and the charged lithium secondary batteries were maintained in a constant temperature chamber at 100° C. for approximately 40 hours. Then, the open circuit voltage (DCV) drop of each lithium secondary battery was measured by measuring the voltage thereof right after each lithium secondary battery was connected to the charger and discharger before or after being maintained at the high temperature. In addition, discharge capacities of the lithium secondary batteries (discharge capacity after being left at the high temperature) were obtained, and high temperature cycle retention rates thereof were calculated therefrom. Then, the discharge capacity of each lithium secondary battery at the 1st cycle of charging and discharging was measured and the high temperature capacity recovery rate thereof was calculated therefrom.

The high temperature cycle retention rate, OCVs before or after being left at the high temperature, the difference between the OCVs, and the high temperature capacity recovery rate are shown in Tables 3 and 4 below and illustrated in FIGS. 5 through 7.

The high temperature cycle retention rate (%) and the high temperature capacity recovery rate (%) are respectively obtained by Equations 2 and 3 below:

High temperature cycle retention rate (%)=discharge capacity after being left at high temperature/reference capacity     <Equation 2>

High temperature capacity recovery rate (%)=discharge capacity at 1st cycle of charging and discharge after being left at high temperature/reference capacity     <Equation 3>

TABLE 3

| | Reference capacity (mAh) | Discharge capacity after being left at high temperature (mAh) | High temperature cycle retention rate (%) | OCV before being left at high temperature (V) | OCV after being left at high temperature (V) | ΔV (V) |
|---|---|---|---|---|---|---|
| Example 7 | 2.482 | 1.828 | 73.7 | 4.30 | 4.06 | −0.24 |
| Example 10 | 2.431 | 1.761 | 72.4 | 4.29 | 4.03 | −0.26 |
| Comparative Example 8 | 2.485 | 1.786 | 71.9 | 4.31 | 4.04 | −0.27 |

TABLE 4

| | Reference capacity (mAh) | Discharge capacity at 1st cycle of charging and discharging after left at hightemperature (mAh) | High temperature capacity recovery rate (%) |
|---|---|---|---|
| Example 7 | 2.482 | 2.377 | 95.8 |
| Example 10 | 2.431 | 2.360 | 97.1 |
| Comparative Example 8 | 2.485 | 2.372 | 95.5 |

Figure 5:
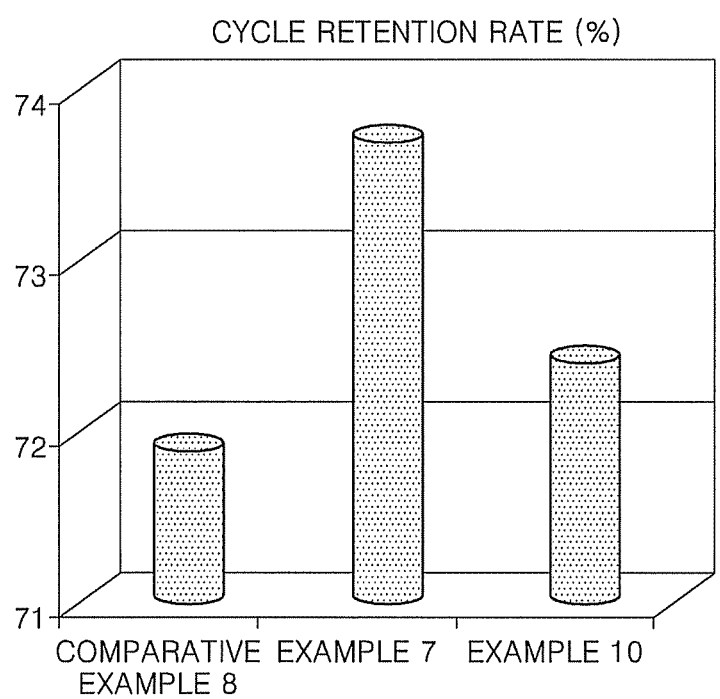
FIG. 5 is a graph showing capacity retention rates of lithium secondary batteries of Examples 7 and 10 and Comparative Example 8 after the lithium secondary batteries are left at 100° C.
Figure 6:
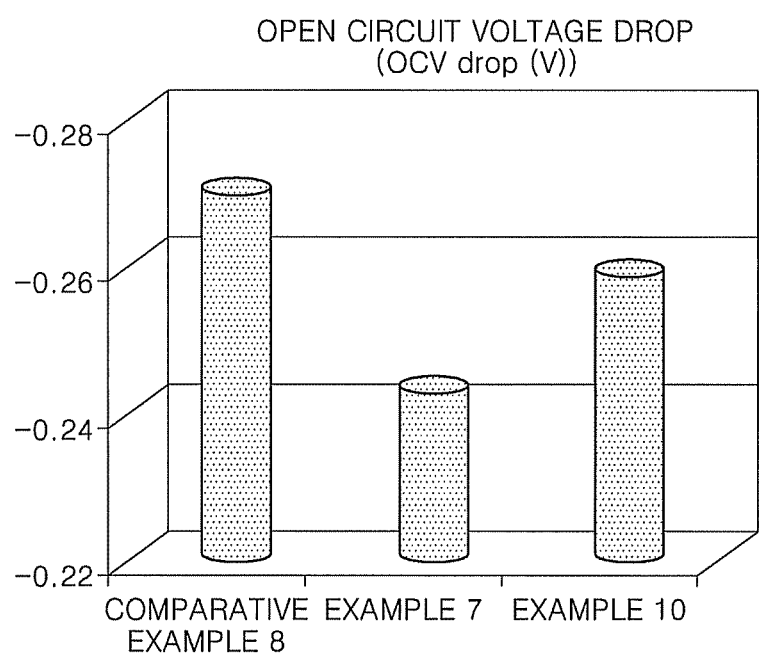
FIG. 6 is a graph showing the drop in open circuit voltage (OCV) of lithium secondary batteries of Examples 7 and 10 and Comparative Example 8 after the lithium secondary batteries are left at 100° C.
Figure 7:
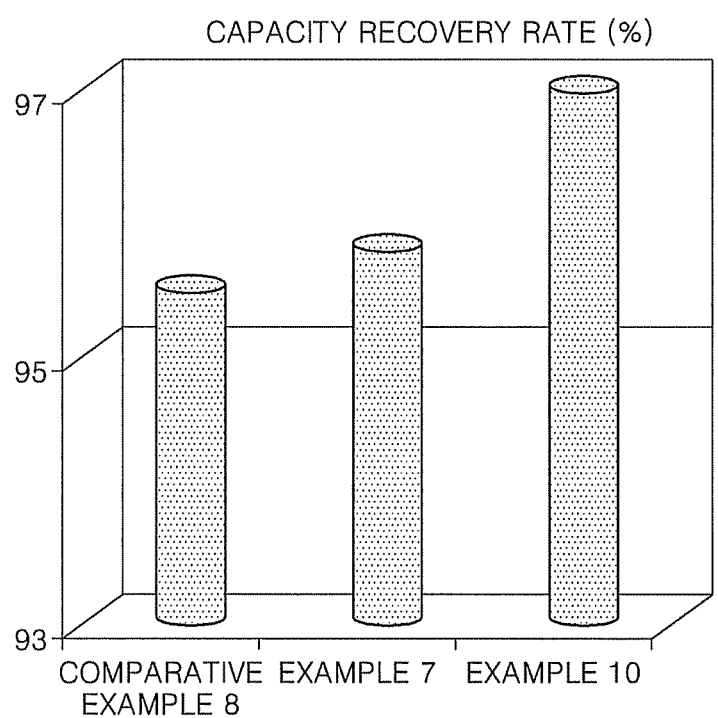
FIG. 7 is a graph showing capacity recovery rates of lithium secondary batteries of Examples 7 and 10 and Comparative Example 8 after the lithium secondary batteries are left at 100° C.

Referring to Tables 3 and 4 and FIGS. 5 through 7, the lithium secondary batteries of Examples 7 and 10 that were left at 100° C. for about 40 hours have higher charge capacity than the lithium secondary battery of Comparative Example 8 that was maintained under the same conditions, and thus have improved high temperature cycle retention rate and OCV characteristics after left at high temperature. In addition, the lithium secondary batteries of Examples 7 and 10 have a high residual capacity after being left at high temperature and thus have improved high temperature capacity recovery rate.

As described above, according to the one or more of the above embodiments of the present invention, an electrolyte for a lithium secondary battery forms a polar thin film on a surface of a positive electrode, and thus has improved high temperature lifetime characteristics and high temperature conservation characteristics. In addition, a lithium secondary battery with improved lithium ionic conductivity may be manufactured using a film formed of a benzazole-based compound having a polar functional group or a derivative thereof.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electrolyte for a lithium secondary battery, the electrolyte comprising a lithium salt, a non-aqueous organic solvent, and an additive represented by Formula 1 below:

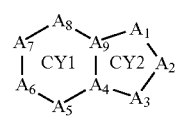

<Formula 1> wherein $A_1$ to $A_9$ are each, independently,

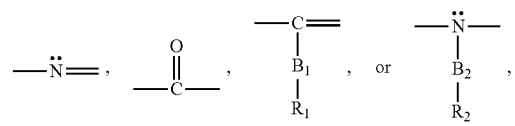

with the proviso that $A_1$ to $A_9$ include at least one of

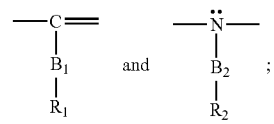

CY1 is a C3-C6 aromatic ring, and CY2 is a C3-C5 aromatic or non-aromatic ring;

$B_1$ and $B_2$ are each independently a single bond,

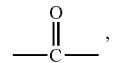

or a C1-C5 alkylene group;

and $R_1$ and $R_2$ are each independently hydrogen, a halogen group, a cyano group, a hydroxyl group, —C(=O)$R_a$, —C(=O)O$R_a$, —OCO(O$R_a$), —C=N($R_a$), —S$R_a$, —S(=O)$R_a$, —S(=O)$_2R_a$, —P$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or combinations thereof, wherein $R_a$ is a C1-C10 alkyl group, or a C6-C20 aryl group, with the proviso that at least one of $R_1$ and $R_2$ includes a polar functional group selected from the group consisting of a halogen group, —C(=O)$R_a$, —C(=O)O$R_a$, —OCO(O$R_a$), C=N ($R_a$), —S$R_a$, —P$R_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group, and with the proviso that at least one of $R_1$ is $SR_a$, wherein $R_a$ is a C1-C10 alkyl group, or a C6-C20 aryl group, wherein a film that is partially or fully derived from the additive in the electrolyte is formed on a surface of a positive electrode in the lithium secondary battery.

2. The electrolyte of claim 1, wherein the additive is represented by Formula 2 below:

<Formula 2>

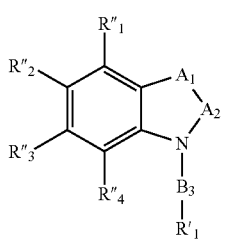

wherein $A_1$ and $A_2$ are each, independently,

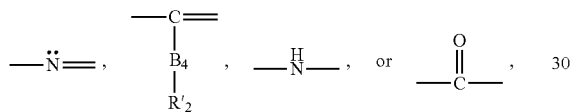

with the proviso that $A_1$ and $A_2$ include at least one of

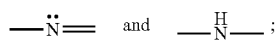

$B_3$ and $B_4$ are each independently a single bond,

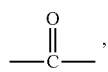

or a C1-C5 alkylene group; and
$R'_1$, $R''_1$, $R''_2$, $R''_3$, and $R''_4$ are each independently hydrogen, a halogen group, a hydroxyl group, a cyano group, —C(=O)$R_a$, —C(=O)O$R_a$, —OCO(O$R_a$), —C=N($R_a$), —S$R_a$, —S(=O)$R_a$, —S(=O)$_2R_a$, —P$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or a combination thereof, wherein $R_a$ is a C1-C10 alkyl group, or a C6-C20 aryl group, with the proviso that at least one of $R'_1$, $R''_1$, $R''_2$, $R''_3$, and $R''_4$ includes a polar functional group selected from the group consisting of a halogen group, —C(=O)$R_a$, —C(=O)O$R_a$, —OCO(O$R_a$), C=N($R_a$), —S$R_a$, —P$R_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group, and with the proviso that at least one of $R'_2$, $R''_1$, $R''_2$, $R''_3$, and $R''_4$ is —S$R_a$, wherein $R_a$ is a C1-C10 alkyl group, or a C6C20 aryl group.

3. The electrolyte of claim 2, wherein the additive is at least one compound selected from the group consisting of

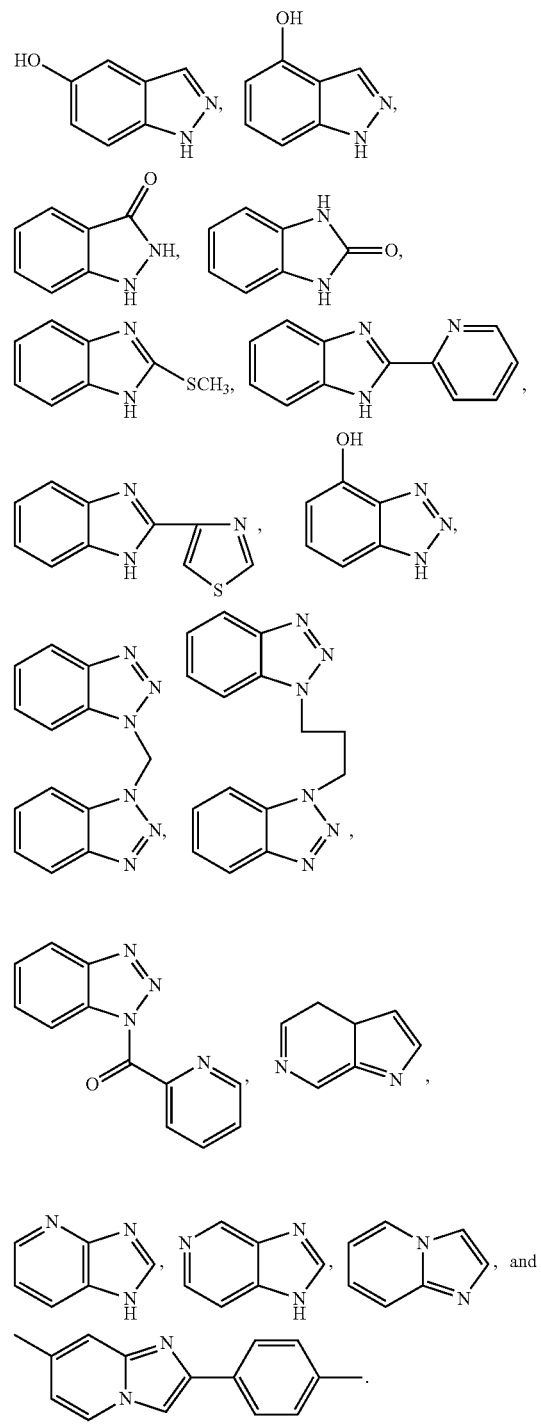

4. The electrolyte of claim 3, wherein the additive is at least one compound selected from the group consisting of

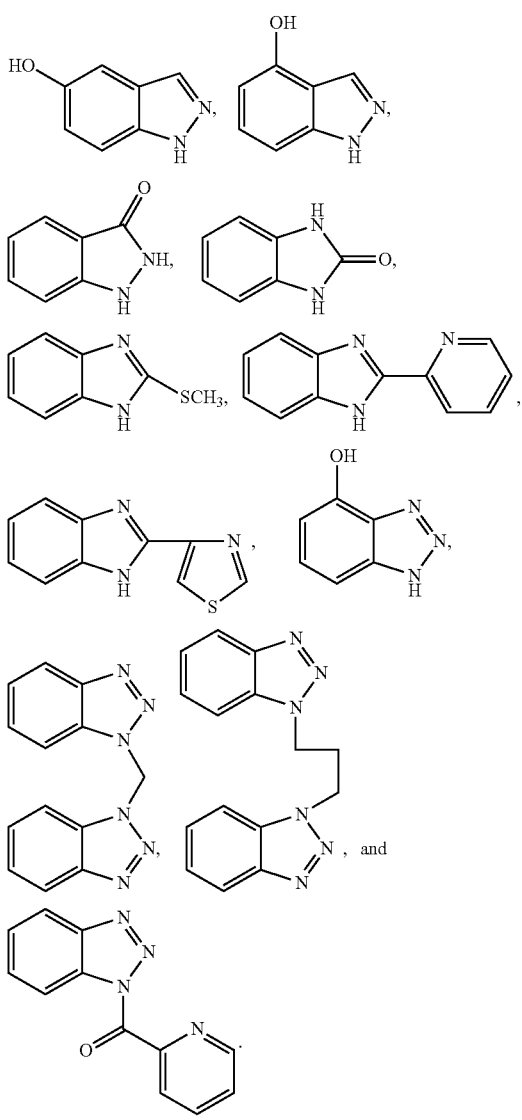

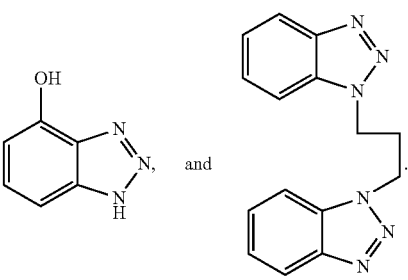

6. The electrolyte of claim 1, wherein the amount of the additive is in a range of about 0.005 to about 10 wt % based on the total weight of the electrolyte.

7. The electrolyte of claim 6, wherein the amount of the additive is in a range of about 0.01 to about 5 wt % based on the total weight of the electrolyte.

8. The electrolyte of claim 1, wherein the lithium salt is at least one compound selected from $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiBPh_4$, $LiN(C_xF_{2x+1}SO_2)(C_yF_{2y+1}SO_2)$ where x and y are natural numbers, LiCl, LiI, lithium bisoxalate borate (LIBOB), and combinations thereof.

9. The electrolyte of claim 1, wherein the non-aqueous organic solvent is a carbonate-based solvent, an ester-based solvent, an ether-based solvent, a ketone-based solvent, an alcohol-based solvent, a non-protonic solvent, or combinations thereof.

10. A lithium secondary battery comprising:
a positive electrode comprising a positive active material into or from which lithium ions are intercalated or deintercalated;
a negative electrode comprising a negative active material into or from which lithium ions are intercalated or deintercalated; and
an electrolyte interposed between the positive electrode and the negative electrode,
wherein the electrolyte comprises a lithium salt, a non-aqueous organic solvent, and an additive represented by Formula 1 below:

<Formula 1>

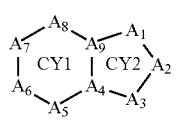

wherein $A_1$ to $A_9$ are each, independently,

5. The electrolyte of claim 4, wherein the additive is at least one compound selected from the group consisting of

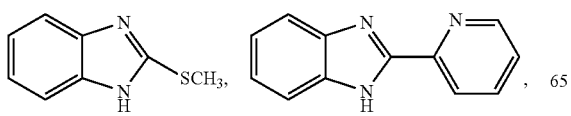

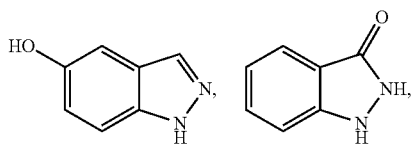

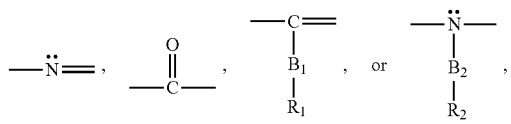

with the proviso that $A_1$ to $A_9$ include at least one of

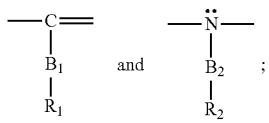

CY1 is a C3-C6 aromatic ring, and CY2 is a C3-C5 aromatic or non-aromatic ring;

$B_1$ and $B_2$ are each independently a single bond,

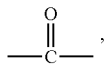

or a C1-C5 alkylene group; and $R_1$ and $R_2$ are each independently hydrogen, a halogen group, a cyano group, a hydroxyl group, —C(=O)$R_a$, —C(=O)O$R_a$, —OCO(O$R_a$), —C=N($R_a$), —S$R_a$, —S(=O)$R_a$, —S(=O)$_2$$R_a$, —P$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or combinations thereof, wherein $R_a$ is a C1-C10 alkyl group, or a C6-C20 aryl group, with the proviso that at least one of $R_1$ and $R_2$ includes a polar functional group selected from the group consisting of a halogen group, —C(=O)$R_a$, —C(=O)O$R_a$, —OCO(O$R_a$), C=N($R_a$), —S$R_a$, —P$R_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group, and with the proviso that at least one of $R_1$ is —S$R_a$, wherein $R_a$ is a C1-C10 alkyl group or a C6-C20 aryl group, wherein a film that is partially or fully derived from the additive in the electrolyte is formed on a surface of a positive electrode in the lithium secondary battery.

11. The lithium secondary battery of claim 10, wherein the additive is represented by Formula 2 below:

<Formula 2>

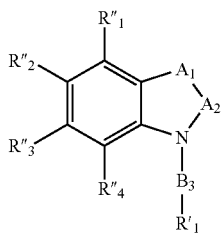

wherein $A_1$ and $A_2$ are each independently

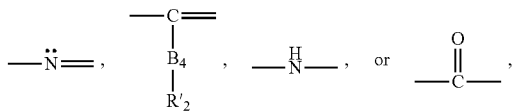

with the proviso that $A_1$ and $A_2$ include at least one of

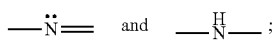

$B_3$ and $B_4$ are each independently a single bond,

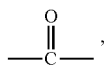

or a C1-C5 alkylene group; and $R'_1$, $R''_1$, $R''_2$, $R''_3$, and $R''_4$ are each independently hydrogen, a halogen group, a hydroxyl group, a cyano group, —C(=O)$R_a$, —C(=O)O$R_a$, —OCO(O$R_a$), —C=N($R_a$), —S$R_a$, —S(=O)$R_a$, —S(=O)$_2$$R_a$, —P$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C+heteroaryl group, or a combination thereof, wherein $R_a$ is a C1-C10 alkyl group, or a C6-C20 aryl group, with the proviso that at least one of $R'_1$, $R''_1$, $R''_2$, $R''_3$, and $R''_4$ includes a polar functional group selected from the group consisting of a halogen group, —C(=O)$R_a$, —C(=O)O$R_a$, —OCO(O$R_a$), C=N($R_a$), —S$R_a$, —P$R_a$, a substituted or unsubstituted C1-C20 alkoxy group, a C2-C20 alkylene oxide group, a substituted or unsubstituted C6-C30 aryloxy group, and a substituted or unsubstituted C6-C30 heteroaryl group, and with the proviso that at least one of $R'_2$, $R''_1$, $R''_2$, $R''_3$, and $R''_4$ is —S$R_a$, wherein $R_a$ is a C1-C10 alkyl group or a C6-C20 aryl group.

12. The lithium secondary battery of claim 11, wherein the additive is at least one compound selected from the group consisting of

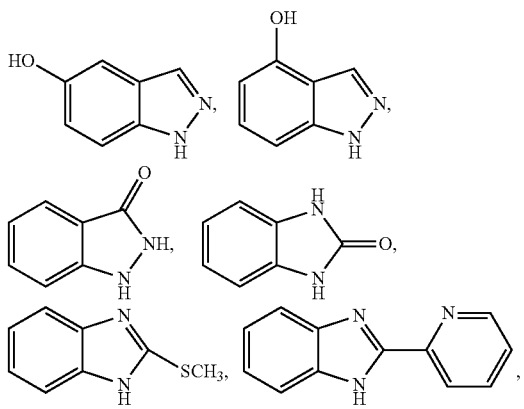

-continued

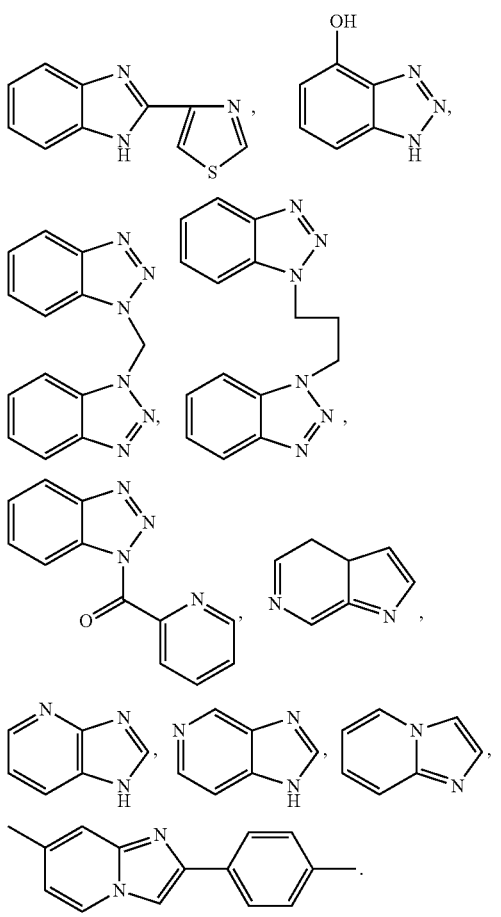

13. The lithium secondary battery of claim 12, wherein the additive is at least one compound selected from the group consisting of

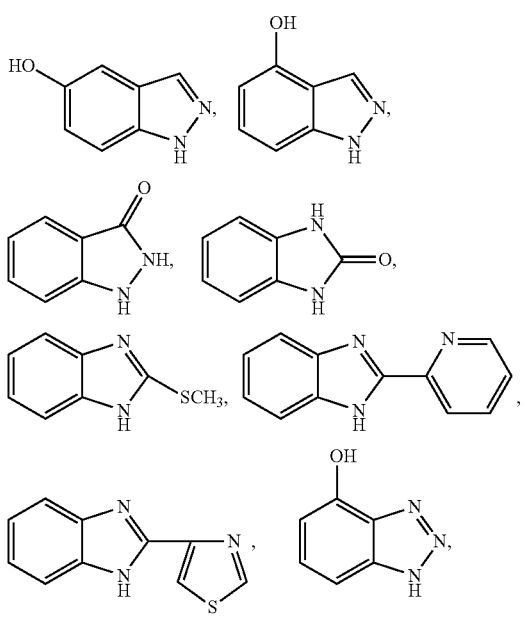

-continued

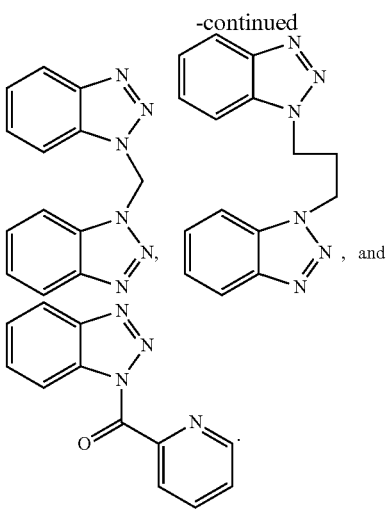

14. The lithium secondary battery of claim 13, wherein the additive is at least one compound selected from the group consisting of

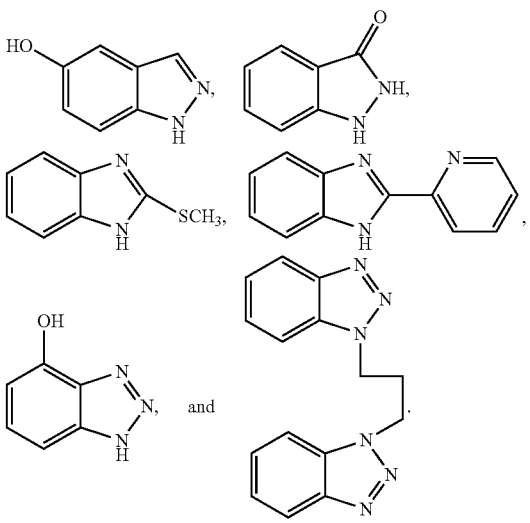

15. The lithium secondary battery of claim 10, wherein the thickness of the film is in a range of about 0.5 nm to about 100 nm.

16. The lithium secondary battery of claim 10, wherein the amount of the additive is in a range of about 0.005 to about 10 wt % based on the total weight of the electrolyte.

17. The lithium secondary battery of claim 10, wherein the amount of the additive is in a range of about 0.01 to about 5 wt % based on the total weight of the electrolyte.

18. The lithium secondary battery of claim 10, wherein the positive active material is at least one material from the group $LiCoO_2$, $LiNi_{1-x}Co_xO_2$ where $0 \leq x < 1$, $Li_{1-x}M_xO_2$ where M is Mn or Fe and $0.03 < x < 0.1$, $Li[Ni_xCo_{1-2x}Mn_x]O_2$ where $0 < x < 0.5$, $Li[Ni_xMn_x]O_2$ where $0 < x \leq 0.5$, $Li_{1+x}(M)_{1-y}O_z$ where $0 < x \leq 1$, $0 \leq y < 1$, $2 \leq z \leq 4$, and M is a transition metal, $LiM_2O_4$ where M is Ti, V, or Mn, $LiM_xMn_{2-x}O_4$ where M is a transition metal, $LiFePO_4$, $LiMPO_4$ where M is Mn, Co, or Ni, $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta\text{-}Mn_yV_2O_5$, $\delta\text{-}NH_4V_4O_{10}$, $Mn_{0.8}V_7O_{16}$, $LiV_3O_8$, $Cu_xV_2O_5$, $Cr_xV_6O_{13}$, $M_2(XO_4)_3$ where M is a transition metal and X is S, P, As, Mo, or W, and $Li_3M_2(PO_4)_3$ where M is Fe, V, or Ti.

19. The lithium secondary battery of claim 10, wherein the positive active material is $Li_{1+x}(M)_{1-x}O_2$ $0.05 \leq x \leq 0.2$ and M is a transition metal.

20. The lithium secondary battery of claim 10, wherein the positive active material has an operating potential of 4.5 V ±0.5 V.

21. The lithium secondary battery of claim 10, wherein the negative active material is at least one material from the group vanadium oxide, lithium vanadium oxide, Si, $SiO_x$ where $0 < x < 2$, Si-T alloys where T is Mg, Ca, Sr, Ba, Sc, Y, Ti, Zr, Hf, V, Nb, Ta, Cr, Mo, W, Re, Fe, Pb, Ru, Os, Rh, Ir, Pd, Pt, Cu, Ag, Au, Zn, Cd, B, Al, Ga, Sn, In, Ti, Ge, P, As, Sb, Bi, S, Se, Te, or combinations thereof, graphite, soft carbon, hard carbon, meso-phase pitch carbide, and calcined coke.

22. The lithium secondary battery of claim 10, wherein the lithium salt is at least one selected from $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiBPh_4$, $LiN(C_xF_{2x+1}SO_2)(C_xF_{2y+1}SO_2)$ where x and y are natural numbers, LiCl, LiI, lithium bisoxalate borate (LIBOB), and combinations thereof.

23. The lithium secondary battery of claim 10, wherein the non-aqueous organic solvent is a carbonate-based solvent, an ester-based solvent, an ether-based solvent, a ketone-based solvent, an alcohol-based solvent, a non-protonic solvent, or combinations thereof.

* * * * *